US008438111B2

(12) United States Patent
Driessen

(10) Patent No.: US 8,438,111 B2
(45) Date of Patent: May 7, 2013

(54) RETAIL POINT OF SALE (RPOS) DIGITAL RIGHTS CONVERGENCE

(76) Inventor: James Leonard Driessen, Lindon, UT (US)

( * ) Notice: Subject to any disclaimer, the term of this patent is extended or adjusted under 35 U.S.C. 154(b) by 439 days.

(21) Appl. No.: 12/772,919

(22) Filed: May 3, 2010

(65) Prior Publication Data
US 2011/0112917 A1 May 12, 2011

Related U.S. Application Data

(63) Continuation of application No. 11/329,526, filed on Jan. 11, 2006, now Pat. No. 7,742,993, which is a continuation-in-part of application No. 09/630,272, filed on Aug. 1, 2000, now Pat. No. 7,003,500.

(60) Provisional application No. 60/215,673, filed on Jun. 30, 2000, provisional application No. 61/175,108, filed on May 4, 2009, provisional application No. 61/187,686, filed on Jun. 17, 2009, provisional application No. 61/241,477, filed on Sep. 11, 2009.

(51) Int. Cl.
*G06F 21/24* (2006.01)
(52) U.S. Cl.
USPC .............................................. 705/58; 705/57
(58) Field of Classification Search ................... 705/58, 705/57
See application file for complete search history.

(56) References Cited

U.S. PATENT DOCUMENTS

| 5,103,392 | A |   | 4/1992 | Mori |   |
|---|---|---|---|---|---|
| 5,530,751 | A | * | 6/1996 | Morris | 380/202 |
| 5,570,339 | A | * | 10/1996 | Nagano | 369/275.3 |
| 5,592,511 | A |   | 1/1997 | Schoen |   |
| 5,710,886 | A |   | 1/1998 | Christensen |   |
| 5,864,604 | A |   | 1/1999 | Moen |   |
| 5,918,909 | A |   | 7/1999 | Fiala |   |
| 5,930,215 | A | * | 7/1999 | Fite et al. | 369/53.22 |
| 5,953,415 | A | * | 9/1999 | Nielsen | 705/58 |
| 5,995,105 | A |   | 11/1999 | Reber |   |

(Continued)

FOREIGN PATENT DOCUMENTS

| JP | 411066152 A | 3/1999 |
|---|---|---|
| WO | WO-9819260 A1 | 5/1998 |

OTHER PUBLICATIONS

Goldstein, A., "Computer City Opens Prototype, in Mesquite Texas," Dallas Morning News, Nov. 22, 1997.* Microsoft Press Computer Dictionary, third edition, Microsoft, 1997, p. 82.

(Continued)

*Primary Examiner* — Nicholas D Rosen

(57) ABSTRACT

The present invention is an apparatus and method for the money transactions required in the selling of merchandise or media content on the Internet or other public or private network. It can then track and maintain digital rights to merchandise or media. Methods of access to digitally protected content are disclosed. License metadata and credentials from multiple types of digital rights management systems may be used to grant access through a home based or other end-user custodial digital rights "place-chaser" to content protected by different types of serial copy management systems. Content security using a non-audible or invisible code signal sequence(s) can provide traceability as well as absolute anonymity for the purchaser. This apparatus can be used to conduct transactions off the web so that business can be done on the web.

18 Claims, 12 Drawing Sheets

U.S. PATENT DOCUMENTS

| | | | |
|---|---|---|---|
| 6,175,823 B1 | 1/2001 | Van Dusen | |
| 6,278,980 B1 | 8/2001 | Wendkos | |
| 6,405,175 B1 | 6/2002 | Ng | |
| 6,434,535 B1 | 8/2002 | Kupka | |
| 6,467,684 B2 | 10/2002 | Fite | |
| 6,487,663 B1 * | 11/2002 | Jaisimha et al. | 713/193 |
| 6,615,247 B1 | 9/2003 | Murphy | |
| 6,708,157 B2 | 3/2004 | Stefik | |
| 6,952,685 B1 * | 10/2005 | Hunter et al. | 705/58 |
| 7,028,011 B1 * | 4/2006 | Ha et al. | 705/57 |
| 7,065,506 B1 * | 6/2006 | Phillipo et al. | 705/58 |
| 7,209,889 B1 | 4/2007 | Whitfield | |
| 7,308,430 B2 * | 12/2007 | Odgers et al. | 705/57 |
| 8,190,709 B2 * | 5/2012 | Kanada et al. | 709/219 |
| 2001/0001321 A1 | 5/2001 | Resnick | |
| 2001/0001854 A1 | 5/2001 | Schena | |
| 2001/0032878 A1 | 10/2001 | Tsiounis | |
| 2001/0037316 A1 | 11/2001 | Shiloh | |
| 2002/0029241 A1 | 3/2002 | Yokono | |
| 2002/0069104 A1 | 6/2002 | Beach | |
| 2003/0093335 A1 | 5/2003 | Silverbrook | |
| 2003/0142035 A1 | 7/2003 | Goldstein | |
| 2003/0158790 A1 | 8/2003 | Kargman | |
| 2003/0200179 A1 | 10/2003 | Kwan | |
| 2004/0006607 A1 * | 1/2004 | Kanada et al. | 709/219 |
| 2004/0015404 A1 | 1/2004 | McCarthy | |
| 2005/0192896 A1 | 9/2005 | Hutchison | |
| 2008/0046375 A1 | 2/2008 | Jakubaitis | |

OTHER PUBLICATIONS

Mambo, Masahiro, editor, "Information Security," Second International Workshop, ISW '99, Kuala Lumpur, Malaysia, Nov. 1999 Proceedings.

Buelva, A.J., "Philippines: Union Bank Launches, 'Net Banking Initiative'", Computer World (Philippines), Dec. 15, 1999.

Driessen v. Sony et al.; Def. Sony, Best Buy, Target answer and counter claim, Case 2:09-cv-00140-DAK Doc. 15, 15-1, 15-2 Filed Jun. 24, 2009.

Driessen v. Sony et al.; Def. FYE answer and counterclaim, Case 2:09-cv-00140-DAK Document 14 Filed Jun. 23, 2009.

Unknown, Electronic sell-through is the future of VOD, Broadcast Engineering, Strategic Content Management Newsletter, Jul. 26, 2005 USA.

Unknown, Coming soon: Download-to-own films, CNN, Technology Section, Mar. 24, 2006, USA.

Unknown, Schedule of Minimums, Writers Guild of America, 2008, Theatrical and Television Basic Agreement, Feb. 13, 2008, USA.

Netpack, Inc., Press Release, New Internet Packaging System, Allows Consumers . . . , Lexis-Nexis, Financial Times Information, Feb. 21, 2001.

Levi Shapiro, Hollywood goes EST, Entrepreneur Connect, Entrepreneur Media, Inc., Apr. 2008 issue.

Stephanie Olsen, CinemaNow debuts Download-to-own movies, CNET News, Jan. 4, 2004.

Jakubaitis, U.S. Appl. No. 60/140,929.

Superdistribution, In Wikipedia, The Free Encyclopedia. Retreived 10:45, May 29, 2009, from http://en.wikipedia.org/index.php?tilte—Superdistribution&oldid~.

Tower Records Promotion, Case 2:09-cv-00140-DAK, Document 15-2,15-3 (Jun. 24, 2009). Administrative Office ofthe U.S. Courts, PACER CM/ECF, retreived Jul. 23, 2009.

Pete Cashmore, Big Brother, Amazon Remotely Deletes 1984 From Kindles, retreived Jul. 23, 2009 from http://mashable.com/2009/07/17/amazon-kindle-1984/.

Remus, P.C. et. ai, "Digital Signatures: THe Nest Step in Electronic Commerce,"New Hampshire Business Review, vol. 19, No. 10,p. 15, May 1997.

Gentry, C.R., "Chain Cultivates Farming Niche," Chain Store Age, vol. 76, No. 3, pp. 67-77, Mar. 2000.

Anon., "Appearing Soon at a Store Near You: An ATM for the ears," NewYork Times, vol. CXLIX, No. 51,364, P.D7, Apr. 2, 2000.

Anon., "Mala Powers: Hollywood Star Still Shines on Walk of Fame," Business Wire, Sep. 27, 1994.

Dyson, P., "Millicent: Digital Equipment's Scrip for Selling Content by the slice," Sybold Report on Internet Publishing, vol. 2, No. 3, p. 37, Nov. 1997.

Oser, K., "Wells Fargo Launches ATM Advertising," Direct, vol. 11, No. 5, p. 22, Apr. 1999.

2:09-cv-00 140-DAK Driessen v. SonyBMGMusic Entertainment et al Bates No. SNYOOOOOOO I-SNYOOOOO 195.

* cited by examiner

FIG. 7
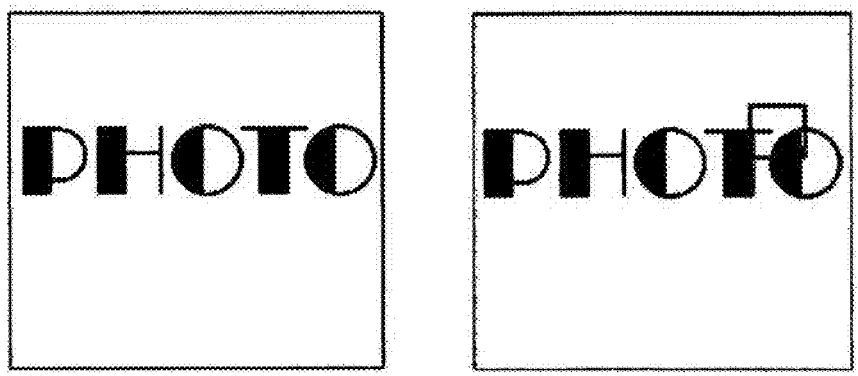
Zoom of Selected Area
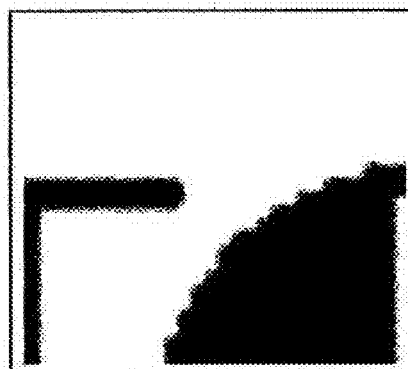
Pixel Selection
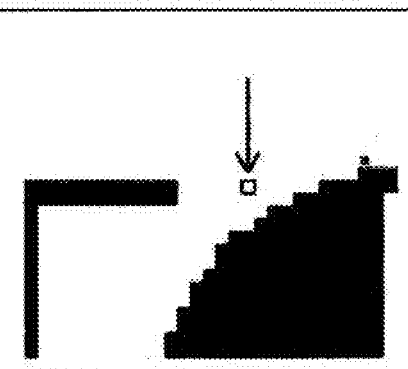
Normal Pixel
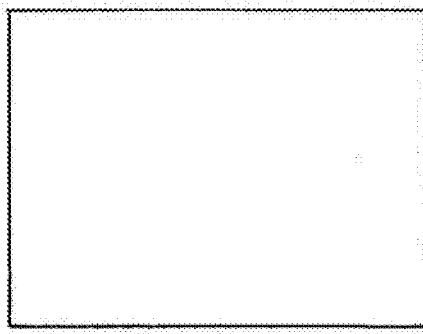
Example: After hidden pixilization
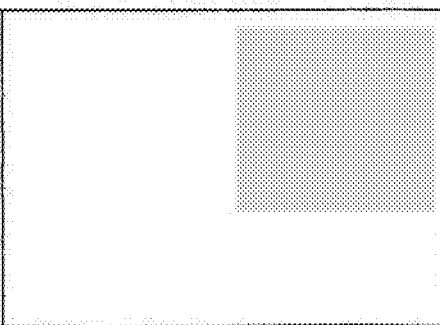

FIG. 8

| Courier 10 BT | Courier New |
|---|---|
| A | A |
| B | B |
| C | C |

RETAIL POINT OF SALE (RPOS) DIGITAL RIGHTS CONVERGENCE

RELATED APPLICATIONS

Priority is claimed in this application to the Utility patent application (Child application) Ser. No. 11/329,526, which is a Continuation in Part Application, titled "SCART-CARD (SECURE CONSUMER ADVANTAGED RETAIL TRADING)" filed on Jan. 11, 2006 now U.S. Pat. No. 7,742,993; in turn claiming priority to the Utility patent application (Parent application) Ser. No. 09/630,272, filed Aug. 1, 2000 now U.S. Pat. No. 7,003,500; then claiming priority through Provisional Patent Application No. 60/215,673 filed on Jun. 30, 2000. This Application also claims priority to Provisional Patent Application No. 61/175,108, filed May 4, 2009; Provisional Patent Application No. 61/187,686, filed Jun. 17, 2009; and Provisional Patent Application No. 61/241,477, filed Sep. 11, 2009.

INCORPORATION BY REFERENCE

Each of the above stated priority documents, Ser. Nos. 11/329,526, 09/630,272, 60/215,673, 61/175,108, 61/187,686, and 61/241,477, are herein incorporated by reference into this application in their entirety.

BACKGROUND OF INVENTION

1. Field of the Invention

This invention relates generally to purchasing systems via a public computer network system (Internet or World-Wide-Web). While the products sold on the Internet are often real and tangible, the market place exists in a virtual realm. To conduct the business of selling in the virtual realm of the Internet, a virtual transaction had to take place; or so it has been thought. This Invention facilitates non-virtual transactions that take place at a retail point of sale for a means of virtual merchandising.

2. Related Prior Art

Retail industries can exist anywhere. The historical version of retail was the actual retail point of sale. A retailer established a store where customers could visit, look at merchandise and make purchases. The customer had to visit the store in order to purchase the products. Other forms of retailing have existed like local street vendors, door-to-door salesmen, shop-by-telephone, mail order catalogs, infomercial shop-by telephone, and most recently, the Internet.

One of the differences between retail point of sale and other methods of sale is the time variable involved with merchandising transactions. One should not make the mistake of assuming that time is the essential element that distinguishes between direct purchases and those on account. The basic formula for establishing a credit account is where the purchase price (P) of a product can be paid at a later time (T), an interest rate (R) can be assessed, and the amount paid:

$$(A) = P(1+R)^T.$$

A person may gain extra time to pay for a purchase by using credit, but it is the agreement between parties that one will extend credit to the other that creates a credit account. Time has no meaning in the direct purchase formula (A)=P. For that matter, there is always some lag between the time payment is tendered and possession takes place even if for just split seconds. Sometimes a lag between payment and possession requires a voucher so that the purchaser has some proof that payment has been made. The voucher is usually just a simple sales receipt. Other times it can be a ticket such as for attending a theater or other engagement. The voucher in this case does not represent an account or value of money. The voucher merely represents that the transaction has been completed and the merchandise, whether physical merchandise or simply entertainment, has been authorized.

Retail points of sale transactions involve at least one in-person contact with the buyer. On the Internet, it has always been assumed that this transaction must be conducted virtually on the Internet; after all, the Internet is a virtual realm. With the huge rise in popularity of the Internet, there are rising concerns from the public about who should and who should not be able to access certain Internet content such as but not limited to: materials with copyrights such as music, content that is adult in nature, or other restricted access material.

Regulatory authorities and web masters have made attempts to control access through the selling of access rights over the Internet itself. These services are often called subscription based I.D. or age verification services. User names and passwords or other means of secure access have been delivered to consumers after they entered credit card information. This has become an accepted means of control, particularly with Adult Verification systems.

Public Key infrastructure (PKI) is one method that has evolved into a secure and anonymous means of handling web transactions through the uses of encryption, trusted vendors, and trusted banking institutions. PKI methods of Web transactions may involve digital signature and money transactions over the Internet. They typically require a customer, a bank, a merchant, a public archive such as an Internet web site, Certificate Authorization servers, and encryption and decryption of the data.

Most secure web transactions require cookies and Web delivered applets (such as JAVA). A cookie is information that a Web site puts on an end-users hard disk so that it can use the information at a later time.

Using the Web's Hypertext Transfer Protocol (HTTP), each request for a Web page is often independent of all other requests. For this reason, the Web page servers typically have no memory of what pages it has sent to a user previously or anything about previous visits. A cookie is a mechanism that allows the server to store its own information about a user on the user's own computer. For example, the Internet Explorer browser stores cookies in a Windows subdirectory. Netscape stores cookies as a single text file.

As more and more people in world populations use computers, there becomes an increased need for security to control what data can be accessed, where and when people can access it, and which people are allowed any access to secure data. Copyrighted materials are of a particular area of interest as the media material objects such as records, tapes, and disks are now being replaced by digital media content. There have been numerous attempts at ways to prevent illegal copies. There have been primarily two different categories in which these content protection systems fall: 1) file server protection that allows authorized access while at the same time protecting illegal access by hackers attempting to steal the copyrighted materials without paying for them; and 2) preventing end-users from illegally sharing unauthorized copies with others.

Both of these types of systems have focused primarily on the file server side in controlling who, when, where, and what can download the media. More recent efforts have looked into using multiple Digital Rights Management "DRM" systems through a "Keychest" or "Digital Entertainment Content Ecosystem" which does not focus on the one file server, but considers a digital rights storage locker solution as a third party digital rights clearing house. Yet, third party digital rights storage locker systems have also remained true to the above typology, delivering multiple instance or types of security from multiple file servers through one centralized security service.

DESCRIPTION OF INVENTION

RETAIL POINT OF SALE APPARATUS (RPOS) Digital Rights Convergence is a return to the simplistic approach of pre-Internet ways of doing business, but it is not an obvious approach. As malicious attackers of Internet communications become more common, the Internet security measures become increasingly sophisticated. The RPOS takes away some of the sophistication and uses much simpler yet effective technology in its place. The predefined transaction authorizes access to web content from a place off the web, originates at a real place of business, and is a concept that a trained Internet professional may not be able to grasp immediately; they have been conditioned towards more complicated means of accomplishing the tasks directly on the Internet.

A return to a retail establishment for conducting Web business may hold great promise for Internet security in the future. A search of past practices and inventions reveals a great deal of effort spent on avoiding over-the-counter transactions for Internet e-commerce rather than embracing it as does the RPOS technology.

There are three questions that may be asked when attempting to differentiate the technology:
Do they take cash?
Is there an establishment that acts on behalf of the customer for payment that employs non-virtual (Retail point of sale) to complete the transaction?
Does the customer have to physically go to the establishment to buy the specific online item?

The field of Internet e-commerce has numerous existing patents. A complete search for prior history was not done prior to this filing but a few similar patents were found through a most basic search of the on-line USPTO patent databases. They are reference below to help set the stage for one skilled in the art of Internet commerce to understand the differences between RPOS and previous methods.

This invention is not a Prepaid Internet Access Card, such as used to supply the purchaser of minutes on an Internet Service Providers (ISP) system, see U.S. Pat. Nos. 5,749,975; 5,987,612; 5,749,075, 5,987,430.

This invention is not merely a method for recording information on a card, computer disk, or other means of recording, see example U.S. Pat. No. 6,076,733. The method of recording and/or storage might be bar code, magnetic tape, smart card, written inscription, or any means of recording information. This invention is not used to locate a specific URL, but is used to divine the predetermined transaction that provided access to a particular URL location.

This invention is not an organizational Internet access security system whereby business organizations control access to web content of their own employees or to others on a closed network or to generate personalized content pages for specific business purposes, see U.S. Pat. No. 6,076,166

This invention is not an Internet cash token system used as an anonymous means to get money to spend on the Internet. See U.S. Pat. Nos. 6,076,078; 6,072,870; 6,061,660; 6,042,149

This invention is not electronic-voucher system, which places a third party URL as the guarantor of funds. See U.S. Pat. No. 6,058,381.

This invention is not a mobile Internet media content delivery device in which the device itself carries the content. See U.S. Pat. No. 6,018,720.

This invention is not a means to preview merchandise and set up an account to purchase—as in U.S. Pat. No. 5,918,213, where the merchandise merely previewed at the point of sale, but then the transaction is conducted as an off the shelf purchase, through typical Internet methods, or phone-in-sale automated means. The retail point of sale apparatus for Internet Merchandising is a new means for conducting the actual transaction that could be added to such a system.

This invention is not a device for delivering media content through on-line programmable smart card authorization such as used in satellite television programming, or Web TV devices, where a home user of the system can call in on the telephone to order Pay-per-view programming. In these systems the smart card both receives and supplies data to the system over a private network. RPOS does not require programming after the initial over-the-counter transaction.

Although the user of the RPOS may be known, it can also be used completely anonymously.

This invention is much like an event ticket to a movie theater or music concert except that the RPOS is specifically used for access (entrance) to Internet merchandising.

While RPOS can facilitate Secure Web Transactions, it is not a method of the transaction, merely a method of divining the existence of a predetermined web transaction. It does not require a trusted vendor, trusted bank, or buyer authentication. While RPOS may facilitate some of the same types of functions mentioned above, it uses a completely new method.

This invention is essentially retail point of sale for the Internet. In order to best set the stage for a reader of this patent application to best understand the background of this invention and distinguish it from prior art, several descriptive names of the invention are listed below. This is not intended to be an exhaustive list but merely illustrates some of the ways such an invention can be used. After this list, for the remainder of this document, the Invention will be referred to as the RPOS. Although it involves a voucher system, the voucher need not exist in all circumstances. RPOS can use a disk, paper ticket, memory stick, or any other means of supplying an access key and/or utility program.

Descriptive Names
1. Internet Content Voucher System—an end to end virtual controlled distribution system
2. Cookie Free Cache Back System Card—can be used with or without browser cookies or other browser file caching.
3. Prepaid Card for Internet Content Media—it is prepaid, but need not be a stored value card.
4. Web Content Ticket—the specific purchase may be access rights to digital content
5. Over the counter Internet Sale—the purchase of network merchandise can be made at retail over the counter.
6. Simple Anonymity for Internet Content Delivery—the in-person transaction can eliminate the need for submitting identifying information electronically.
7. Face to Face Verification System for Divining of Anticipated Internet Transaction—the in-person transaction in certain embodiments allows verification of the purchase and ownership realization of the merchandise desired by the customer
8. Non Virtual Point of Sale for the Internet—employing real corporeal space within cyber-space.
9. Retail Point of Sale Card for Internet Content—selling network content and merchandise through a retail point of sale location.

10. Internet Authentication Card—Digital certificate credentialing through real space transactions.
11. Internet Adult Verification Card—face to face age verification
12. Internet Allocation Card—Allocating customer ownership to specific online assets.

DESCRIPTION OF DRAWINGS

The following drawings provide examples of different applications and construct specifications for the RPOS technology. They are not meant to be inclusive of all uses, they are merely examples.

Figure 1:
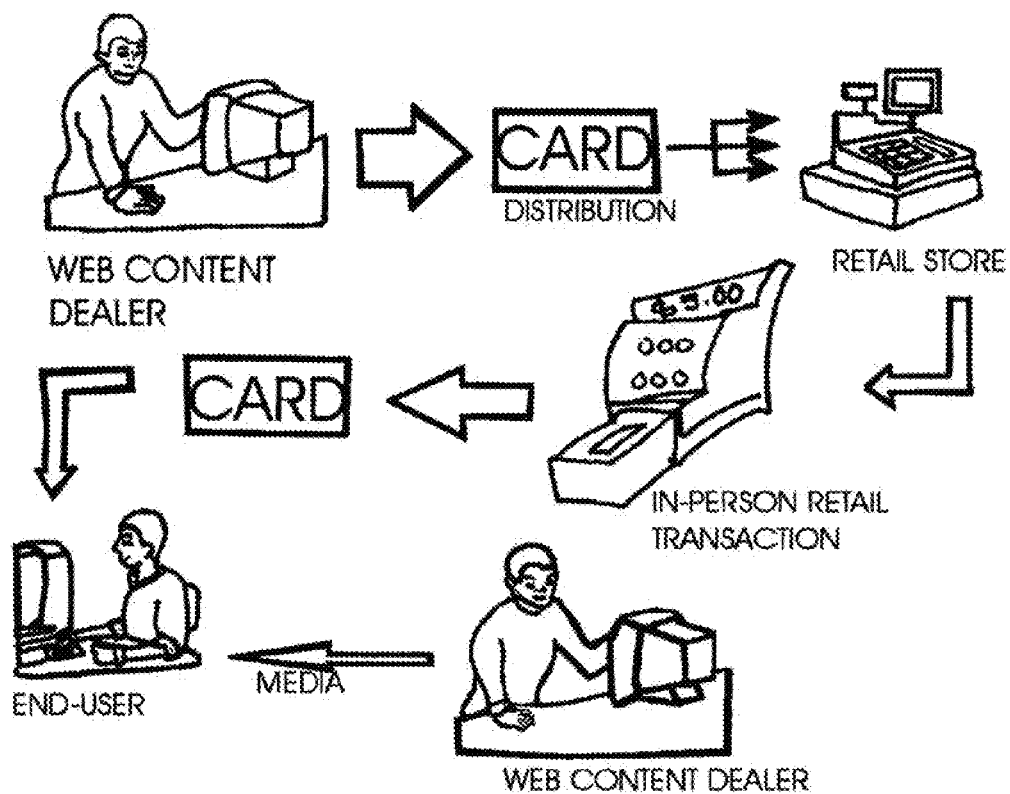
FIG. 1 uses a flow chart to illustrate one embodiment of the RPOS. The process begins with web content dealers who have content posted to a public computer network (Internet) and have chosen to use RPOS for distribution. The web content dealers may manufacture the card themselves or use a third party. The type of security system used for placing the access key on the card is only important as to the particular level of security that is desired. The web content dealer then distributes the CARD, directly or through distribution channels, to a retail establishment. The retail establishment sells the CARD over the counter to the customer. The dealer, distributor, and retail establishment may use whatever profit margins or price mark ups as they choose or is agreed upon. The CARD is delivered to the customer like any other retail product. Continuing along the flow chart in FIG. 1 to the customer, the CARD is used to access only the web content that is predefined by the CARD. The purpose of the CARD in this transaction is only to ensure that the user is in possession of it. The transaction takes place through an over the counter sale.
Figure 2:
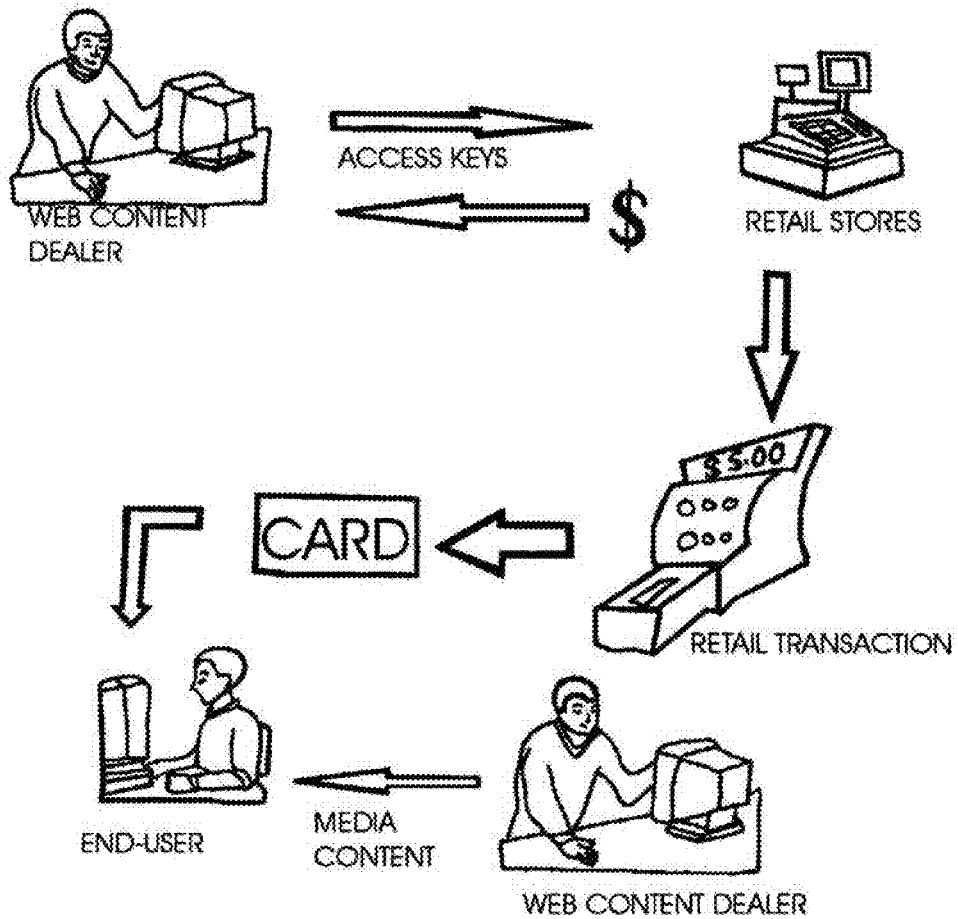
FIG. 2 uses a flow chart to illustrate an alternate embodiment of the RPOS. The process again begins with Web Content Dealers. In this application the Web Content Dealers may or may not subscribe to the RPOS system (i.e. make their own CARDs). To facilitate the creation of a CARD for the WEB Content Dealers, a retail establishment supplies a computer or terminal as a customer access point, which provides Internet access, and issues a CARD to a customer upon entering the retail establishment. The customer browses the web and looks for content to purchase. Whenever a Web Content Dealer requires some sort of payment and the customer agrees, the customer authorizes payment from the retail establishment and by default the retail establishment agrees to the purchase. The customer is not required to enter his or her own name, credit card payment information, address, or any other information that they do not choose. Upon leaving the establishment, the customer pays the retail establishment the amount required for content received or to be received. The purpose of the CARD in this transaction is only to ensure that the user is in possession of it. The actual transaction takes place through an over the counter sale.

The processes shown in FIG. 2 illustrate a subtle difference from prior art used in Internet commerce, in that Internet access can be used to help the customer to choose which media content to purchase and to later retrieve on whatever computer the customer chooses, but internet access is not needed. Internet access may not be not required during the recording of specific media content locations (URLs); they can be simply written down, picked out from a written menu after having seen the web dealers preview pages, or retrieved as a menu item from the local computer at the check out. Internet access is also not required during the recording of the specific access information, or during the retail transaction. While Internet Access during these processes may be used to facilitate the RPOS processes, it is not required. While the CARD holds some intrinsic value it does not hold any dollar amount information, account information, or other means of payment; the transaction is completed in person at the checkout.

Figure 3:
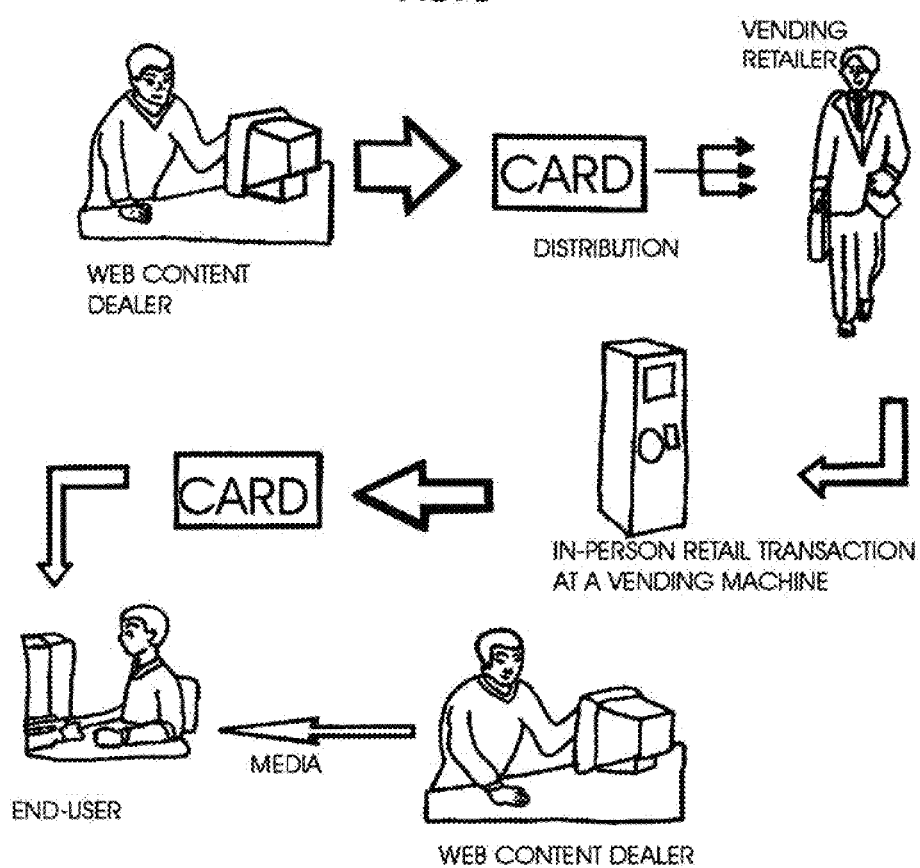

FIG. 3 uses a flow chart to illustrate an alternate use of the RPOS. The process again begins with Web Content Dealers. A Vending Machine Dealer purchases CARDs through normal product distribution channels. Customer purchases the CARD from the vending machine acquiring the ability to access the desired web content. This type of system is not capable of age verification as with over the counter sales. Again, the purpose of the CARD in this transaction is only to ensure that the user is in possession of it. The actual transaction takes place through a vending machine.

Figure 4:
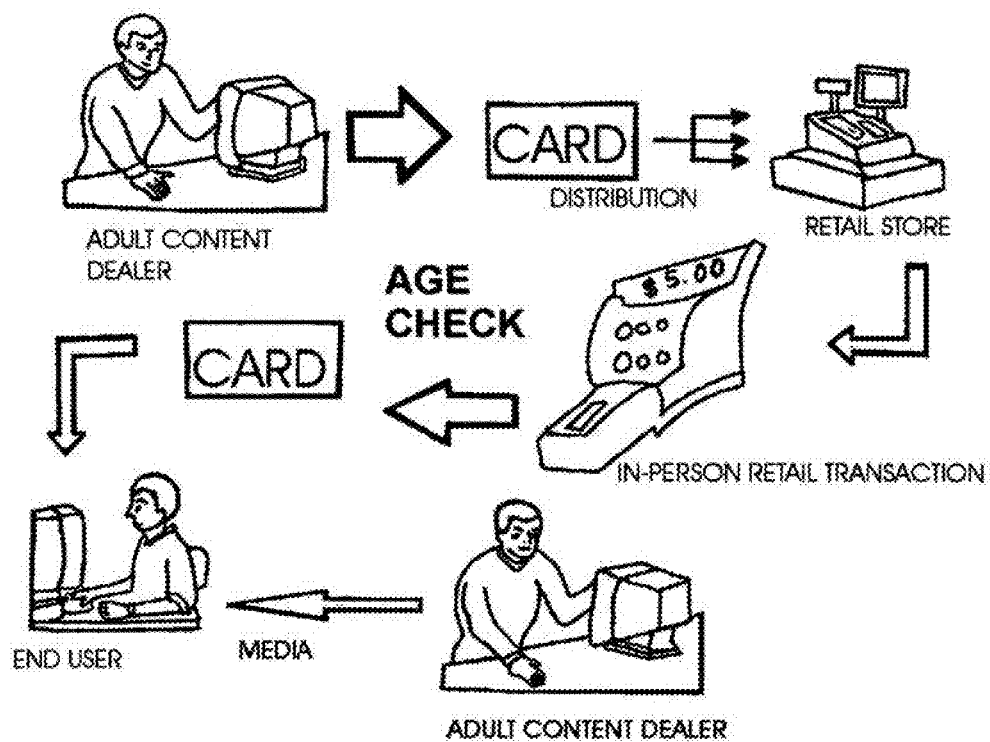

FIG. 4 illustrates how CARD is used as an age verification system (Adult Check). The process begins with dealers of adult materials on the Internet. A retail establishment (such as video rental store, convenience store, bookstore, adult merchandiser, or other type of store) obtains CARDs through typical distribution channels. Customers purchase the CARD over the counter provided they can prove they are of legal age to do so. A customer may physically transport the CARD to a location where customer has access to a computer that is capable of receiving Web content. The customer uses the CARD to obtain access to those specific materials the seller of the CARD intended.

Figure 5:
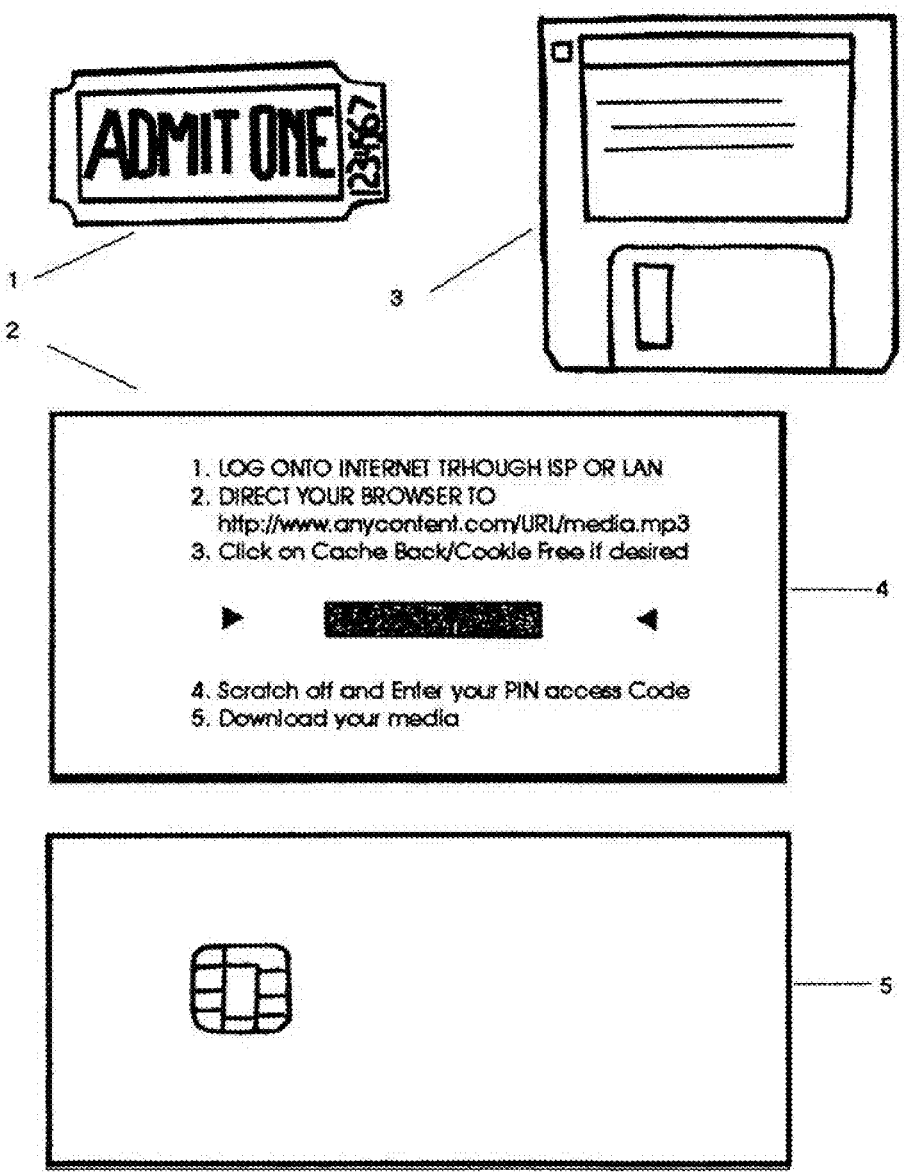

FIG. 5 shows some examples of recording devices that are used or could be modified for use as the media delivery method, access CARD, or to deliver the small cookie free cache back application.

Figure 6:
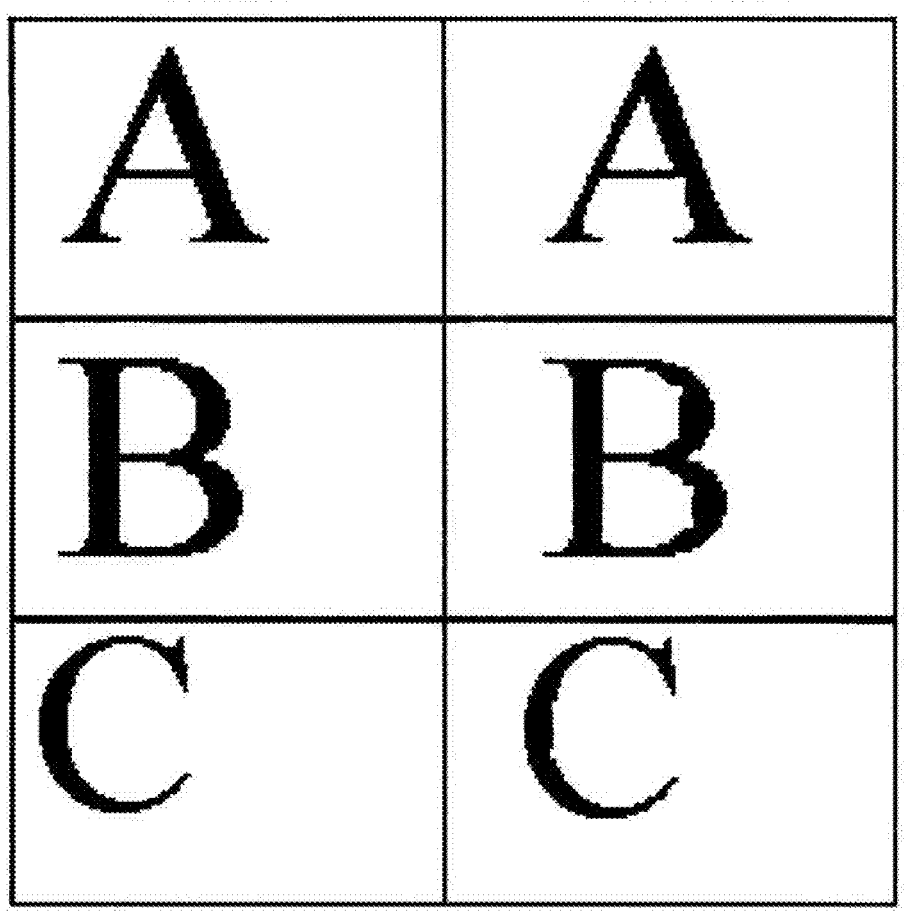

FIG. 6 is an example of Font Fingerprinting where a font subset file must be delivered to the user.

FIG. 7 is an example of Hidden Pixelization for Content Fingerprinting

Figure 8:
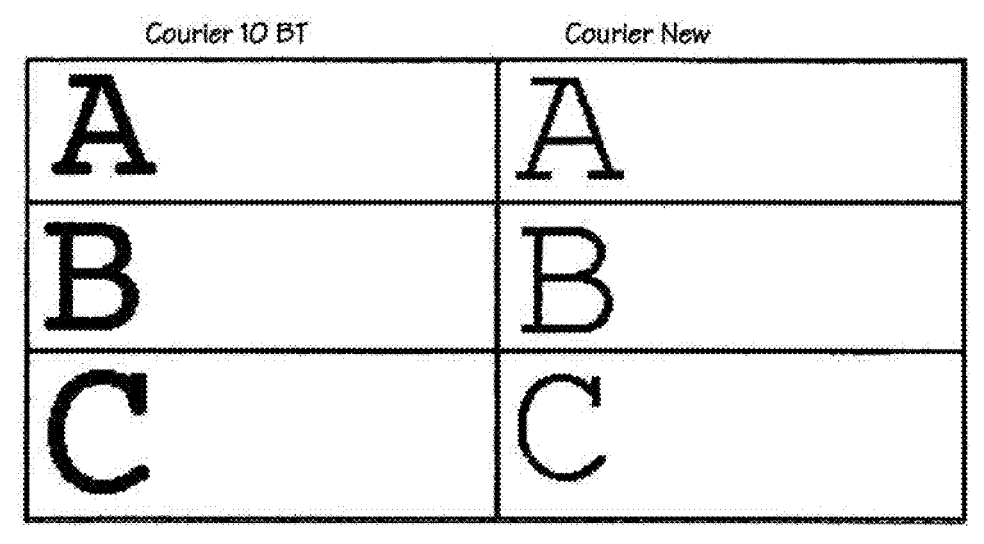

FIG. 8 illustrates the similarities between the New Courier font and the Courier 10 BT font.

Figure 9:
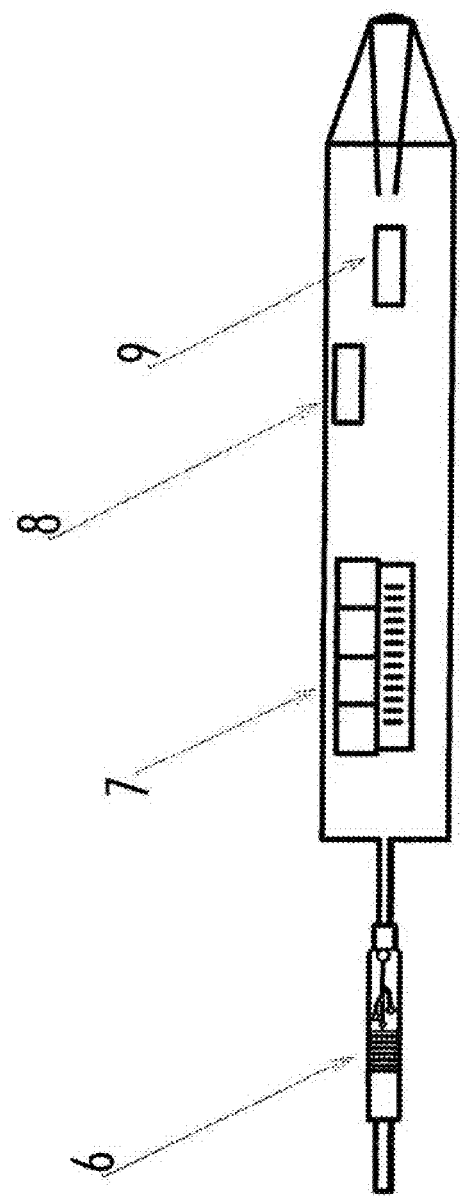

FIG. 9 illustrates the Scanner/CARD combination system. The barcode scanner portion of the Scanner/CARD device is made up of components well known in the art such as a metal shielded wand with a fiber optic bundle, light source and light detector. The programmable flash memory module, 7 is onboard to store data received by the scanning apparatus, and the USB interface, 6, in this embodiment allows for connection to most typical PC computer systems. The light emitter 8 and the CCD type imaging/light sensor unit for this embodiment show where the barcode data is received by the unit. The unit shown in the FIG. 9 is already fully commercially available as shown or in other varying shapes and sizes. In this embodiment, the CARD portion of the Scanner/CARD device is again only to ensure that the user is in possession of it. The actual transaction can take place through scanning items and then checking out at a cashier, self serve check out, or other sales register where transfer of ownership rights is activated.

Figure 10:
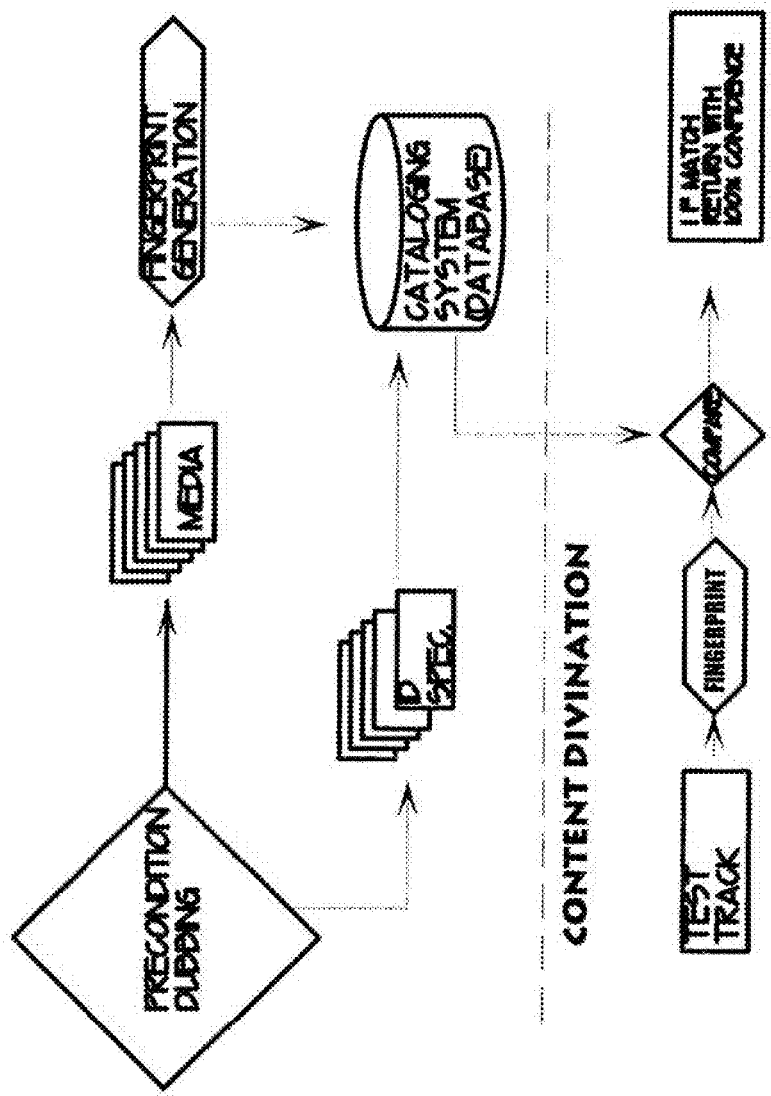

FIG. 10 is a graphical flow chart of the content fingerprinting process whereby the formula, Copy+SCMS+Impairment Validation=Legally Transferable Backup, may be accomplished in one or more embodiment of the invention. (SCMS means Serial Copy Management System)

Figure 11:
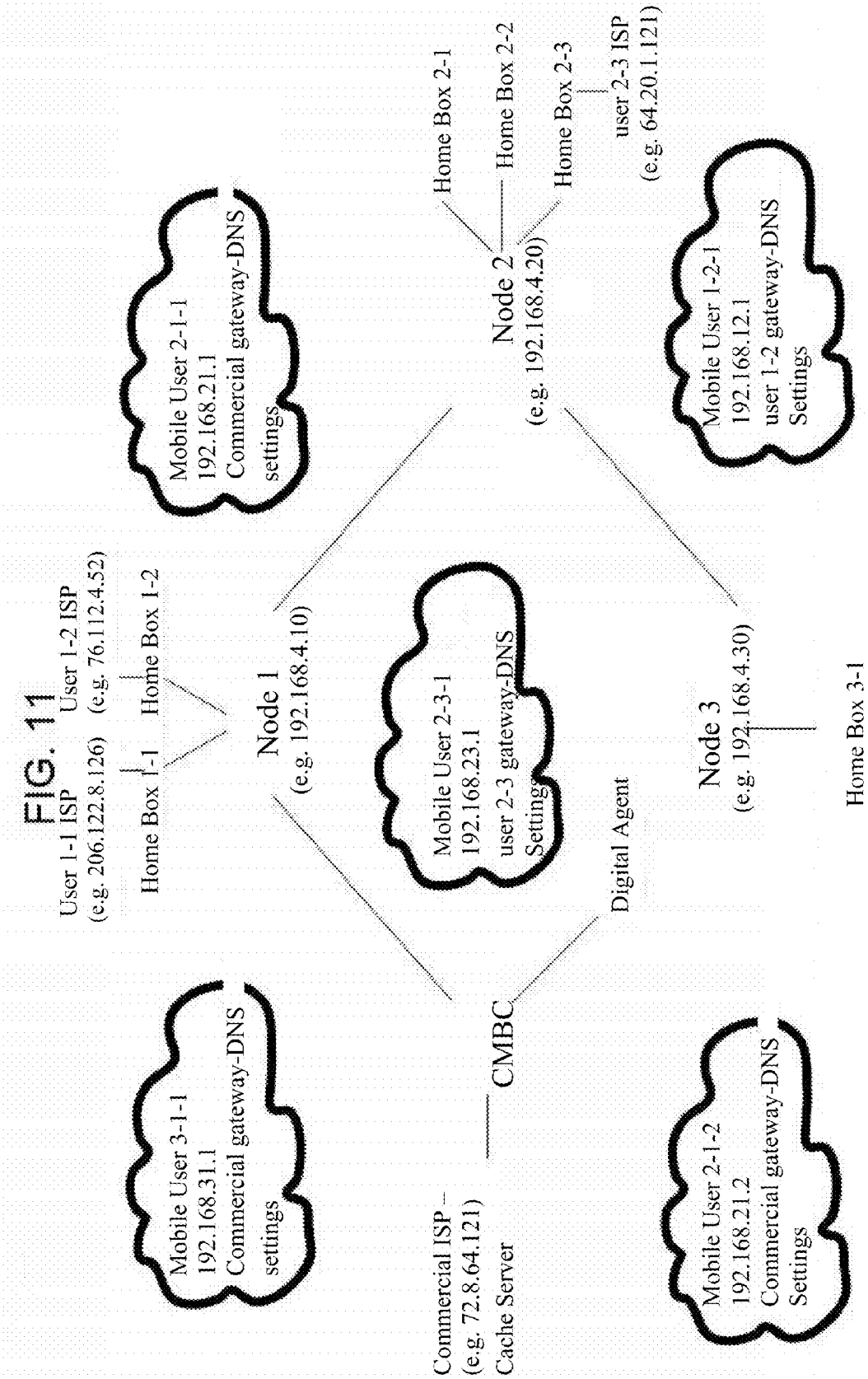

FIG. 11 is a flow chart diagram of a convergent mesh block control architecture that can create layer-2 and/or tunneling connectivity for secure digital rights control through local head-end digital agents working along-side or even directly with other network assets to accomplish the digital rights time-space-place shifting through the "Home Box" appliance.

Figure 12:
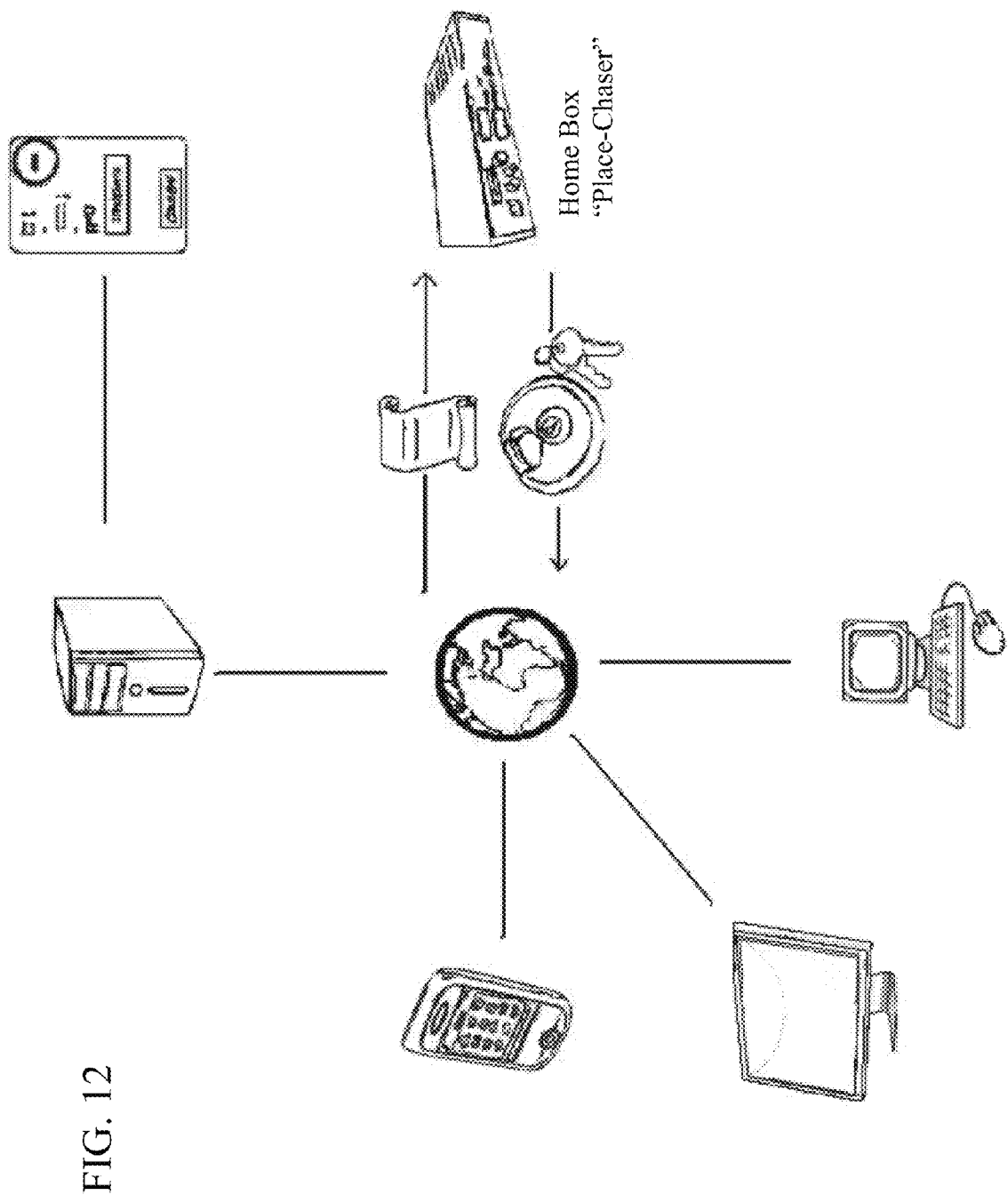

FIG. 12 shows the Home Box "place chaser." It can be utilized as customer premises equipment ("CPE") depicting in-home (or business setting) or end-user custody placement, whether stationary or nomadic on the network. Smaller versions of the CPE could also be used nomadically and travel with an end-user. Like most other set-top boxes as used in cable TV and satellite industries, the Home Box firmware is typically not end-user programmable and in certain embodiments may serve as a home media player when connected to an audio-visual playback and/or display device within the home. Since it can also be network enabled, in its preferred embodiment, the Home Box serves as the intermediary between the certificate authorization "web" system services and remotely connected end-user play-back equipment. A single-use or multiple use license for playback can be checked-out to a remote end-user playback device, depending on what license may have been purchased. If another request instance occurs while the single-use license is checked out, the proprietary play-back key from the Home Box "place-chaser" can be programmed to not release another key unless and until the play-back key gets checked back into the Home Box by the end-user playback device that had it checked out. Thus, the content media can be played on any device, but only in a one to one relationship with one device at a time.

The license, A, is a form of digital rights given by the copyright owner to a digitized work of authorship indicating a certain portion of the "bundle of sticks" is being transferred for rights ownership to an entity or individual. However, the initial transfer is merely to place such rights in a controlled manner into the virtual realm through a web server or services system, B, which in today's technologically driven world typically refers to the world-wide-web, or internet, but the network may be public or private—open or closed, and the intended embodiments for the RPOS invention may come in many network configurations.

For this embodiment, and elsewhere in this application, the World-Wide-Web, which has an "Earth" connotation, has often been depicted in graphic as a globe or similar picture of the earth. For purposes of this application, the female gender, as in "mother" earth or in this case "Mother," may also be used to describe these virtual realms which may include one or many computers. "Mother" system merely means that the world-wide-web or other large scale public or private computer network systems may be programmed to accomplish one function or system. A "Mother" system thereby is a good term to use when referring to a world-wide system in terms of motherhood, fertility, creation or the bountiful embodiment. In this case, the internet system (world-wide-web) when used within the RPOS physical or natural Home Box system, the virtual spaces of the internet may sometimes be referred to as the "Mother" system.

It is also contemplated that each content license, A, may be treated as a single use license, but multiple licenses of the same content may be assigned if multiple licenses have been purchased by the end-user or otherwise supplied. For example, the same feature length film may be allowed to be viewed on more than one playback device at the same time, but only if more than one single-use license has been assigned to the Home Box ("place-chaser"), C, by the web authentication services.

A continuous and/or periodic handshake routine, D exchanging certificates and/or keys in either direction, between the web authentication services and the Home Box can ensure that only the proper number of licenses have been assigned to the Home Box "place-chaser" and only the proper number of unlock codes or credentials have been exchanged with remote devices, F. Tampering with the non-user programmable firm-ware can trigger a disagreement between the web authentication services and the home-box which can in turn trigger alerts and/or disable the Home Box and any subsequent content unlocking or keys G, which can upset the Mother system, E.

DETAILED DESCRIPTION OF THE INVENTION

The RPOS may be utilized as an "actual point of sale" device for Internet content. Previous waves of invention attempting to satisfy the needs of secure web content on the Internet have delivered many "virtual point of sale" techniques and emphasis has been on the transaction itself and how to exchange money over the Internet.

The RPOS invention is unique in the way it does not follow the trend to do everything on the Internet and uses "actual point of sale" as the place where a predefined Internet sales transaction takes place. The information provided by web delivered cookies or applets is not required by RPOS because the information is already included; it may be hand delivered to the computer by the user. Additionally, some web servers require information from the purchasing computer to be stored on the web-server. Some or all of those messages can also be fulfilled by the RPOS.

A security access key may be provided in the form of a prepaid card sold as a retail item. The access key has a one time or multiple Internet session use as provided by the seller of the card. Through obtaining the CARD, the purchaser may gain access to the website or specific web page(s) intended by the seller for either a defined duration of time or indefinite duration of time. Any time the end user (customer) of the CARD is on the Internet, a very simple utility program may be deployed to ensure that there are no changes to the cache content of the customer's computer and no cookies are accepted or transmitted during the delivery of the media content. The utility of the invention is that it provides a method of controlling web access that requires at least one transaction be completed in person. No connection to a banking system for credit referencing is required, no vast system of computer networks is needed to verify anonymity and account status. The actual transaction takes place over the counter. The delivery takes place on a computer of the users choice.

The CARD can be embodied as a voucher system that may be used only to authenticate that the user of the card is in fact the one in possession of it. The user of the CARD uses the card to access the content or merchandise from the computer of their choice. As the time required for the user holding the card to receive the desired content is decreased, the need for the CARD itself may become unnecessary. The content itself may be recorded to disk compact disk, cassette, VHS tape, or other recording media: the media may be recorded at the point of sale location.

The content that is recorded may be Internet content media or the content may be the purchase agreement for merchandise, also called an Internet shopping cart. When the content is a purchase agreement for merchandise, the payment can be made for the merchandise by the RPOS. The RPOS assumes responsibility for payment to the Internet vendor and the purchaser specifies the shipping address of such merchandise. The CARD in this situation may simply be a receipt of sale or other proof of payment.

Unlike any previous method of payment for Internet commerce in the past, there is no need for an account, credit, or other means of electronic payment required for the buyer in the transaction. The proof can be within the content itself. The content can become the verification of a sale. Internet merchandisers such as but not limited to Amazon, Barnes and Nobel, Buy.com, Outpost, and others provide a verification page for each sale, which they intend to be printed by the user. These types of verification pages are excellent examples of specific URL shopping cart information that can be determined ahead of time and sold whether it is for merchandise or content media. The purchase of content media may include the media itself and/or may include a license or access to the media, as may be provided by a key.

When the purchase is for non prepackaged merchandise such as content media, the media may be individually licensed with a unique serial number for protection against counterfeiting. Content fingerprinting is one of the methods used. Traditional forms of digitally protected media may also be used.

The fingerprint can be file tag data known as content "metadata," which has been employed as a file "header" and contains file information to be used for protecting the digital content. The file "header" metadata can be serialized and can be embedded into a number of popular file formats, without breaking their readability. Embedding metadata in the file itself avoids many problems that occur when metadata is stored separately. Metadata is extensively used with protected digital content to deliver information about the file on the file, but has usually been separate from the actual content of the file. In some embodiments a computer receiving a metadata "tagged" file can read the metadata, but cannot read the file content without proper keys to unlock the file. The Adobe Extensible Metadata Platform (XMP) is one such standard, created by Adobe Systems Inc. Information Interchange Model (IIM) is another that has been for the most part replaced by the newer XMP standard. Content fingerprinting (analog placement of codes) on the content instead of or in addition to file header metadata, can add an additional level of security which is not lost when content is displayed or copied because it is found on the actual content rather than just on the header of the file.

Content Fingerprinting

In the industry of internet publishing, one of the problems has been unauthorized copying, posting or otherwise revealing of sensitive materials for wide distribution. Millions of dollars in uncollected royalties are lost each year. Publishers have no way of detecting the responsible parties who willfully post the materials or otherwise "leak" the materials for wide distribution. One answer to the problem is a mechanism or way to "mark" individual copies of recorded material for licensing so the publishers can feel confident that appropriate royalties are being paid. The "mark" should be something not easily detected or removed.

The Graphical User Interface (GUI) of a marking program may use two side by side text windows, One window may be used for the visible message and the other window may be used for the shorter encoded information, Once the two messages are input, the user clicks on a button for encoding which makes all the necessary adjustments to encode the hidden information into the visible message and saves to one file.

This document suggests just some basic methods of fingerprinting internet content with embedded codes or hash codes: Font Fingerprinting, hidden pixelization, concealed ASCII and non visible/inaudible codification. This sample of methods is meant as introductory schemata only and is in no way exhaustive of the endless modes and embodiments which content fingerprinting may be applied.

Font Fingerprinting

Bar codes are typically comprised of black and white stripes, yet all that a bar code really represents is a binary code. For Font Fingerprinting of Internet content, hidden binary codes are placed into documents so that a specific record of the content travels with the document. It can be much different from digital signature for example where the file itself is tagged and encrypted and cannot be read unless the proper keys are used to decrypt the message. For fingerprint marking of the document, the mark stays with the document even after it is properly received and possibly changed.

A base font is modified only slightly so as to not be immediately noticeable to the human eye, yet enough for machine recognition. The base font becomes the "0" of the binary and the modified font is the "1". Any text string can be modified to imprint a binary coded binary (BCB). The decoding is later accomplished using a scanner with a character recognition system capable of distinguishing the font differences.

Font fingerprinting may be particularly designed to be most readily used for printed media, but the fingerprinting could also follow a soft copied document provided the file format remains Rich Text Format (.RTF) or better, giving access to the font aberrations. The font set used for printing the "fingerprinted" document must also be available to the computer that receives the document. Future developments could include a highly compressed file format capable of self decompression that would mask the fact that the Distributed font set is traveling with the document.

Another method of sending a font generated BCB with a softcopy document, not requiring a font subset file, mixes two available fonts that are a close match such as Courier New with 11 point font and Courier 10 BT with a 10 point font (see FIG. 9).

While the above mentioned combination is readily visible to the naked eye, the text is not noticeably different unless you know what you're looking for. It was just an attempt at finding a good match, but there may be other good system fonts that are a close enough match.

Hidden Pixelization

The format of choice for delivery of images over the Internet has been the jpeg, formally the ISO standard 10918, which keeps the file size for delivery fairly small. All digital images of this type are made up of tiny pixels. For hidden pixelization, a jpeg image may be converted to a similar image of a higher resolution (more pixels). In other words any single pixel in the original image may be recreated as multiple pixels all of the same color. For example a 320×240=76,800 pixel image becomes a 640×480=307,200 pixel image, or roughly four pixels per one pixel of the original image.

Several of the pixels from these new higher resolution images can then be encoded with a BCB by varying the shades within the 4 pixels only slightly leaving the neutral color of the original larger pixel essentially unchanged. Any documents delivered over the Internet that contain these images are thereby permanently marked.

This re pixelization creates four available binary codes in the original pixel. The original color is the "0" code and the slightly changed shade is the "1" of the binary. One of the way of making this system seem less detectable may be to disguise the encoding by causing the encoded jpeg file to still report to the user that it is still a 320×240 image, for example, when in fact it has been changed to a 640×480 image and then report back to the viewing system the proper resolution. If the user resaves the image into a different format such as GIF, the code may or may not be transferred, but as long as images in documents are untouched, the document remains fingerprinted, for example, even if it is printed.

Concealed ASCII

ASCII stands for American Standard Code for Information Interchange. ASCII was developed a long time ago and the characters are not always used in the same way on different computer systems. ASCII was originally designed for teletypes and the first 31 characters in today's applications are no longer used as originally intended. Concealed ASCII finger printing takes advantage of the fact that several of them act the same as the ASCII character "032" in many applications. ASCII 32 is the code for a blank space.

ASCII characters 0, 10, and 13 do not display anything on most Windows applications. Character 9 will move to a tab, making a long blank space. 16 25 and 27 31 produce a black area on the screen in some applications and a blank area in others. So do 19, 11, 12, 14, and 15 on some Windows applications; however, they often cause error messages in the compiler for many applications.

Concealed ASCII can create a BCB by using the standard ASCII 32 in spaces as the "0" character of the binary and an alternate ASCII 0, 10, or 13 with ASCII 32 as the "1" character of the binary.

Example: The quick gray fox jumps over the lazy brown rabbit.

There are nine spaces to use for the BCB in the preceding phrase. The code in the example above reads 010000111. The code for the 2nd, 7th, 8th, and 9th spaces in the phrase is ASCII 10 followed by ASCII 32. The remaining spaces simply use ASCII 32. While the concealed ASCII fingerprinting is not printable, it can be used to travel with text of a printable document Concealed ASCII can easily be lost when transmitted as plain text over the Internet and other systems, but many documents are transmitted over the Internet in specific file formats that would maintain specific ASCII sequences not visible to the reader without looking to the particular codes that generated the text.

Non-visible or Inaudible Codification

Analog signals of non discernable frequencies for human ears or eyes can be individually dubbed into audio recordings, which can later identify the origin of the recording. The sights or sounds created may use a frequency, signal generator, or other means of creating analog signals. The analog signals, which cannot be heard by humans on the recording, can be used for distribution of copyright materials such as mp3 music or dubbed into the soundtrack of a video that may be distributed on the World Wide Web (internet).

Identical songs or videos by the same artist can become individual versions that are licensed to individuals. Using sensitive digital software and computer sound editing tools available from a number of manufacturers the sights and sounds outside the range of human discernment can later be detected to verify if the recording is in fact licensed and who is the owner of the license. The analog signals essentially encode any individual identification to a song, video, or other media that contains audio or video tracks.

The human sound range is between 20 and 20,000 hertz for a young person and much less for an old person. The human visual range for light fits within a range around 400-800 THz. Visual analog signals can also be dubbed into digital video recordings. A feature of non visible or inaudible codification is that signals may be dubbed into the content and not just metadata connected to the file container itself. In non-visible or inaudible codification, the metadata can be embedded in analog, but with digital consequences.

Content Fingerprinting Usefulness

Content fingerprinting could be used for printing secure documents, discouraging unauthorized use, sending secret encoded messages, authentication of modification of documents, counterfeit detection, or other application requiring secure distribution of Internet materials. Content fingerprinting differs from digital signature or digital watermark in that the fingerprinting does not have to be on the file container itself but on the content of the file when interpreted.

Fingerprinting documents is a useful and new idea. The usefulness of the specific methods shown here may be greatly diminished when patented and the PTO discloses to the public. The actual methods of fingerprinting really should be kept as "Trade Secrets". The above methods are not fool proof or even sophisticated enough to hold up against even the least sophisticated of hackers. They are merely offered here as examples of how to individually license Internet materials. As industry looks to the Internet for delivery of every kind of copyrighted material, there will be other specific methods of fingerprinting. Since, nobody is publicly open about their methods for working on this type of copyright protection: the concept itself might be of strategic advantage. Fingerprinting internet delivered media may involve documents, images, videos, sound tracks, or any other type of media that can be produced for the Internet.

The method of providing a level of security in transfer of ownership for prepaid media content over a public computer network (Internet) using a computer can be accomplished using individually coded license, serial number, or other identifying mark through content fingerprinting.

It can use first a visible, audible, or otherwise humanly detectable label version of serial number, coded license number, or other identifying mark; a second label that is only machine visible, audible, or otherwise detectable version of serial number, coded license number, or other identifying mark; and the machine only visible, audible or otherwise noticeable label could be a coded message capable of singularly distinguishing the content from other content of the same or similar type. Any means of recording, writing, or otherwise placing a machine visible or audible code on Internet media content would be useful for content fingerprinting purposes.

Return Merchandise and Retransfer of Ownership

The CARD can also create many advantages over the prior art in the area of tracking of first sales in copyrighted materials, returns of such sales, as well as retransfer of ownership in copyrighted materials or other merchandise. It is well known in the art that Title 17 of the United States Code outlines the specific and exclusive rights of copyright owners. Original artists for copyrighted materials have the exclusive right to prevent others from copying, using, or destroying copyrighted works. Particularly 17 U.S.C. 107 §106 and §106 (a) without other exceptions would disallow anyone from modifying or destroying a copyrighted work. However, §107, §109, and other case specific copyright licensing legalities allow end-users of copyrighted products to sell or destroy their licensed product without the artists permission as well as the make "backup" copies for personal use, which become useable licensed copies, in the event that the original licensed copy becomes damaged or destroyed.

To better understand the benefits of the present invention, one should have a fair understanding of the both U.S. copyright law in relation to what may be considered patentable subject matter. Particularly, knowledge of U.S. copyright law may be especially helpful as to the understanding of the business methods herein disclosed. While the Federal Circuit has not yet defined what specifically characterizes a business method claim and separates it from other process claims, the Court has stated that claims drawn to a method of doing business should not be categorized as a 'business method' claim, instead they should be treated like any other process claim. Love, John J. and Coggins, Wynn W., *Successfully Preparing and Prosecuting a Business Method Patent Appli-*

*cation*, AIPLA, Spring 2001, quoting *State Street Bank & Trust Co. v. Signature Financial Group, Inc.* 47 USPQ2d 1596, 1604 (Fed, Cir. 1998).

The above specification already described a method for creating and tracking a digital backup copy using content fingerprinting. A thorough reading of this section of the specification should facilitate the reader's attention to those above disclosures. When we take a closer look at 17 U.S.C. §202 in an expanded setting of the meaning and purposes of the entire Title 17, we can see a suggestion that an authorized user can also convey the rights in copyrighted media itself, regardless of the existence of or current form of the original media object. So long as the work remains some type of unique and tangible object, the transfer of authorized license for consumer use may also remain intact without the transfer of the original object.

Perhaps because it may be an unfamiliar concept, very little attention has been given to creating a digitally licensed copy out of an already existing licensed copy. Much of the publishing industry's fight against recent piracy of copyrighted materials on the Internet has focused on the stopping of unauthorized distribution of infringing copies.

It is well known in the art of copyrighted materials that the copyright owner is entitled to a certain amount of rights often referred to as the owner's "bundle of sticks." The owner can then choose to sell or license those rights as a whole or break up that "bundle of sticks" in any way as the owner sees fit and desirable to her.

Under the "first sales" doctrine, the exclusive right to vend copyrighted material objects (such as books, vinyl albums, tapes, CDs, DVDs, and various downloadable formats) has been limited to the first sale of any one copy and exerts no restriction on the future sale of that one particular copy, it only restricts against transferring or selling unauthorized copies. This second sale or retransfer of those rights to another party could be compared as an equivalent to a person bequeathing their entire library of books, music, and movies to another person in their last will and testament. Upon the death of that person, the heir may certainly be entitled to ownership of those media material objects and the listening or viewing rights have also been transferred to the testator's beneficiaries.

Likewise, in the present invention, the content fingerprinting portions of the above specification described a disrupting technology to the current legal formula which could allow a consumer controlled copy of an existing authorized media format which could transfer ownership to a third person (i.e. second sales) even if electronically transferred. However, since the legalities of any such retransfer of listening or viewing rights would become a question for a court, which certainly at the time of this application has not been convened, the novelty of any process which was described in the above specification may still be patentable subject matter and the usefulness of such an invention need not depend on a courts interpretation of copyright law.

No matter how any Court in the issues of Copyright infringement would choose to define the disruptive technology, even stated in the best light to the copyright owner, the thorough ability to track and enforce non-authorized copies of copies, have provided a legal chain of traceability in the past and various technologies have been known to accomplish serial tracking in the prior art.

The present invention offers improvements over previous methods in that every copy may be traced back to the original licensed copy even if formatting changes in the file or content have taken place and there is still an original media material object that exists separate from the content, namely the CARD. The present invention may thus become a legally disrupting technology worthy of exemption under the first sales doctrine of §109 for infringement. And herein, these disclosures can be the basis for process claims of how to accomplish such an exemption if one were to be carved out under the statute.

Attention can now be drawn to the same invention as described above, only in relation to the copyright laws of the United States. Without any further description, a method for creation of the legal digital back-up copy is an intended embodiment of the invention and attention has now merely been drawn to those above disclosures.

If a media material object such as a book, tape, CD, or DVD containing copyrighted material is copied and transferred using the CARD or any of the above taught methods with or without content fingerprinting, if the original "first sales" version of that same media material object is prevented from further circulation (impairment), and if the process circulation prevention is then somehow validated to show reasonable proof of such impairment; then the copy of that of that original "first sales" version may not be a "copy" at all under the meaning of §109 for infringement purposes; it would be much the same as if a set top player holds a "copy" of the media in memory buffers during playback. Displaying, viewing, or otherwise playing of the "first sales" copyright materials is not considered a "copy" for purposes of protected content. In the present invention, a one to one relationship between the "transfer" media and the original media can maintain "first sales" consistency.

The process can be described by the formula: Copy+ SCMS+Impairment Validation=Legally Transferable Backup, where Copy equals the act of creating a backup of the original, SCMS equals a Serial Copy Management System, and impairment validation equals a reasonably traceable record of the original being taken out of circulation and the particular "transfer" media created, which is not a copy of the original media under the meaning of §109 first sales doctrine.

The prior art contains many instances of ways to copy, many ways to create serial copy management systems, and many ways of legally defensible methods of tracking or recording validation of procedures. However, the prior art does not recognize the entire method as explained immediately above along with methods described in the instant patent disclosures.

The question of Legality in the "Legally Transferable Backup" in the above mentioned formula may be left up to a court to decide, but the methods described herein, which are novel and useful means of accomplishing a transferable backup, are what describe this particular embodiment of the invention.

POS Merchandise Scanning and Activation

The use of image-based bar code symbol readers and scanners has been one means for auto-identification of retail products. Examples of image-based bar code symbol reading/scanning systems may include hand-hand scanners, point-of-sale (POS) scanners, and industrial-type conveyor scanning systems.

One embodiment of the present invention could allow a user (consumer) to carry a hand barcode scanner with him/her while at the retail point of sale location. Virtual downloadable items, sample items, or other merchandise can be viewed or tried in the retail setting and then can be itemized and "loaded" onto the RPOS CARD via the hand barcode scanning unit. That scanning unit may then serve a dual purpose as the CARD since the CARD can be anything which can hold an itemization of one or more pieces of merchandise or media.

The user (consumer) can thus scan in items to be placed on or into the CARD voucher system either in real time or while checking out. The specific merchandise can be predetermined during the selection process and then activated to the CARD at the time of checkout. This need not be account activation, but may be transfer of ownership rights activation. This way the items are added to the CARD by the user in possession of the CARD where activation occurs by checking out with POS terminal services which are network enabled.

As the size and shape of the required imaged based bar code symbol reader components are reduced, the combination scanner/CARD system can become more convenient when used as one in the same unit. Putting the scanner and the CARD voucher system together further simplifies the process of associating specific predetermined or itemized merchandise with a retail point of sale Internet transaction.

Presently, most commercial image-based bar code symbol readers are constructed using charge-coupled device (CCD) image sensing/detecting technology which is well known in the art. Other bar-code symbol readers employ laser-based scanning technology, but CCD imaging technology may be the preferred embodiment because it can be adapted to particular illumination requirements needed for different applications. Other methods of imaged-based symbol recognition such as CMOS or others could also be used. The scanner/CARD combination can be large or small, but smaller is normally better. Ideally the Scanner/Card system will fit into a person's pocket or into a wallet such as a credit card size device, but smaller is only better as long as the user can still hold and operate it by hand, but the mode of operation by hand or by any other human interaction is not critical to any particular embodiment. A mobile phone application which makes use of the onboard camera as a scanner is also an intended embodiment.

What makes the scanner/CARD combination system unique is the ability to use image sensing/detecting technology capable of scanning several barcodes and holding those scans into memory, being transported to a check-out location for an in-person transaction, and may also serve as a CARD for divination of the transaction.

Size of the unit may lead to other embodiments of the invention. Herein, however, the selected preferred embodiment is component based and the size of the unit is therefore not specified, because no matter the size of the symbol reading unit used, this embodiment of the present invention merely facilitates the process whereby specific Internet merchandise is predetermined through scanning Just like other embodiments described herein above, merchandise may be added to the RPOS voucher system ("loaded") which may be the activation of ownership rights in the merchandise at the point of sale.

Therefore, stolen RPOS voucher or CARD systems which have not been activated (predetermined) at the network enabled retail point of sale are useless to the thief. While there are many methods for point of sale activation that are old in the art, unlike the CARD system, they have all been activation of money or points accounts, whereas activation of the RPOS CARD can be activation of the merchandise and/or payment for the specific merchandise.

Point of sale activation of merchandise in addition to (or rather than) account activation, is a concept intended for some embodiments. In one embodiment, the activation can be a tracking of time, which is the time when the merchandise has been activated. In the present invention there is an identification of the individual CARD that can be seen outside whatever packaging is used. Then when the CARD is purchased, identification information may be entered at the time of sale to establish the time of sale for that individual CARD. Other methods can include hidden or otherwise invisible to the user individual CARD identifiers. The CARD can also be reusable or contain more than one item of merchandise. In those scenarios, other methods of identification of the specific transaction may be used whether internal to the CARD or a visible means on the CARD, but CARD identification means will still relate to the time of purchase as previously described above with the formula $(A)=P(1+R)^T$. With the present invention, however, the preferred embodiment uses the formula $(A)=P$, as described above, meaning either the merchandise is immediately activated at time of purchase, or if some funds transfers do take place only for system compatibility purposes with other point of sale equipment, then the funds are "loaded" and as close to simultaneously as possible within that system the funds are also withdrawn to complete the payment still under the $(A)=P$ formula so that no interest may accrue or as according to agreement if longer times are required.

Cloud Computing with Carrier Mesh Block Convergence ("CMBC")

Continuing with the RPOS convergent media delivery system, the CMBC may be a routing program which may also function to supply internal IP addresses to a plurality of client nodes and client computing devices connected with one another on a wired or wireless mesh block network, which will allow these connected devices access on the "Intra"net (communicate within the mesh on a secured basis) or access over the "Inter"net (communicate with world wide computers on a secured basis). This can be performed locally and/or performed on the Mother system.

An advantage of this CMBC may be that end-users can choose to either access the Internet through a commercially supplied ISP or they may set up device by device specific authentication causing the CMBC to rout Internet traffic through end-user's own residential gateways. Of course a residential gateway that already has internet access may be also by definition obtained via a commercial ISP. But, what can be interpreted from the previous paragraph was that an ISP need not be universally supplied as a single ISP. Carrier agnostic convergence allows for multiple ISPs to exist on one wired or wireless network. In a business model sense, the CMBC provided end-users with a choice to either keep their current ISP and still connect via the CMBC to the Mesh Block with CMBC directing that end-user "Interconnection" (Internet) packet requests via the users own existing residential gateway or to connect to the Internet through a commercially supplied ISP connected to the Mesh Block from the outside through the CMBC. The residential gateway, which may be the internet connection supplied at the end-users home is also connected to the mesh via the Home Box and can be securely routed only to authorized end-user devices by the CMBC.

The CMBC routing device may be programmed on any programmable logic device that may also have connectivity capabilities to the Mother system. In the preferred embodiment, however, the CMBC may be a computer with multiple-core class processor running on an open Linux based operating system, connected via Gigabit Ethernet to a Commercial ISP through a switched router and broadband modem. Also in the preferred embodiment, the CMBC may be the main TCP/IP routing controller for an IEEE Standards based 802.11a/b/g/n MIMO (multi-in multi-out, millisecond handoff between nodes "fiberless") fully IP Core wireless network with seamless convergence to GSM, CDMA, LTE, 802.16 etc. In other embodiments, the CMBC operates in a wired network or on any frequency within a wireless network.

Another purpose of ISP routing by the CMBC is to allow the Carrier (supplier) of the mesh network to monetize (charge for) both internet and intranet traffic. Since multiple mobile endusers may choose either their own residential gateway or the Carrier supplied commercial ISP, the CMBC creates a managed environment with options; even if the residential gateway interconnectivity is selected, the CMBC still allows the Carrier entity who owns the mesh cloud to charge for INTRA-net access and mobility on a subscription basis.

Security may be maintained because any devices wishing to connect to the wired or wireless CMBC controlled network are forbidden from using static supplied IP address configuration unless specifically authorized by the CMBC through MAC address identification (MAC-48, EUI-48, and EUI-64, hereafter simply "MAC"). In other areas of wireless device identification, such as GSM or CDMA mobile phone, this identification is called electronic serial number or "ESN" identification. Simultaneous connection of two devices with the same MAC or ESN ("cloning") will be disallowed.

As a secondary security protection against cloning in the case where the cloned device only attempts to connect when the authorized device is offline, a security "handshake" protocol has already been initiated upon the first time registering of the authorized device. In other words, the first time an end-user registers an authorized end-user device a separate public-private key pair (or other encrypted or non-encrypted security identifier) may be supplied to the authorized device. Thus, IP address counterfeiting (or cloning) may be disallowed in the case of any multiple or simultaneous access by users with the same ESN.

"Cloning" triggers an "alert" message which temporarily disables all access by any device suspected of ESN cloning, unless and until the discrepancy can be resolved through direct customer contact or other follow-up verification check. If the cloned device seeks to access the network while the originally authorized device is not online, the system may still reject the clone when the clone fails to supply the proper secondary security protection public-private key pair (or other encrypted or non-encrypted security identifier) employed by the hand-shake subroutine. In other embodiments, similar alert messages and handshake routines can be employed with MAC address layer or other device identification protocol checking.

The device specific MAC, ESN, or other machine level identification can allow for independent or mutual commercialization of the end-user payment gateways for both INTRA-net and INTERnet traffic. The CMBC payment system may be secure because end-users may still be offered services even if they only have INTRAnet connectivity and cannot tie up bandwidth on the end-user's ISP connection or the commercial ISP connection unless and until authorized by the CMBC. Digital media rights may be controlled at the MAC address level thereby creating a secure means for either licensing or electronic sell through of digital media assets to the enduser. Digital Rights Management (DRM) may be one way to managed digital media rights employed to specific content merchandise. Many forms of DRM such as Windows Media DRM, FairPlay (iTunes); Helix & Harmony; Orion/EasyLicenser; Adobe Protected Streaming, and/or DRM-X by Haihaisoft, primarily use metadata as triggers or keys for access control by passing information on the file, such as the purchaser's name, account information, or email address. This information is not typically embedded in analog, i.e. in the played audio or video data, like a fingerprint, but is kept separate, but within the file container or stream.

Another advantage of the CMBC is to disallow cloning for a subscriber device, but specifically create cloning authorization for an authorized "Agent" device. This Agent device can then serve as the digital agent acting as part cache server, part buffer, and part "time" keeper. An agent device within the mesh block can also cure what is often referred to "latency." When latency occurs in a typical internet initiated session (such as a "VOIP" "SIP" or other commercial internet initiated calling) the typical network reaction to the latency is a "dropped" call and/or data packets.

Since the CMBC may be carrier agnostic, meaning more than one carrier for internet interconnectivity may be used on a subscriber basis within mesh block, then at least one such subscriber device within the mesh block could be an authorized clone of another subscriber device. If this authorized "Agent" clone is then strategically placed with either a wired or wireless "constant" connection, then the Agent can maintain connection for other subscriber devices on the mesh at all times ensuring that dropped packets or delayed handoff during roaming will not interrupt the VOIP SIP or Skype™ call. With "constant" connection maintained by the "Agent" ultimate connectivity is never lost.

Particularly when roaming and the hand off between the mesh nodes occurs in milliseconds, but the latency of reestablishing the internet interconnectivity is temporarily lost, the Agent simply "picks up" for that latency. In one embodiment, the Agent simply uses analog to digital "listening" algorithms, such as speech to text to identify natural "analog latency" (i.e. real-time calculated "dead space" or silence). When the end-user device reestablishes a lost or dropped connection, the Agent which is another computer programmed logic device can orchestrate a "catch up" routine and maintain near to real-time conversation mode.

In other embodiments, when there is too much time lost and too little "analog calculated latency" to be made up, the Agent simply generates a "beep" and flushes any buffered time. The industry standard for such a disconnect followed by a reconnect is the first "high to low" pitched audio signal, "bee-dunk"—followed immediately by the "low to high" pitched signal, "bee-deep" indicating that time sync is back on.

In even the rarer embodiments, where digital agent cannot "calculate" enough analog dead-time for "BeeDeep," the receiver enduser (or the designated receiver enduser when both ends of the call are on the same mesh block) has the ability to manually "FLUSH" thereby wiping the buffer clean. In this embodiment a button, keystroke, or series of key strokes on the subscriber device may be employed to accomplish the manual flush of any time buffer, but other manual or automated digital flush may apply.

The protocol for the AGENT when the "receiver user" pushes a manual flush, is to instantaneously check the connection to make sure the "Flush" has not been requested during an actual interconnectivity issue between the Agent and the other user. If interconnectivity between the Agent and the other user is checked OK, then the Agent can "wipe" time clean, and restoring the session to both users, or to every user in the case of a conference (multiple end-user session) is the result. In this embodiment, the Agent could generate a "Bee-Dunk-BeeDeep" alerting all the end-users that such a flush has occurred—the object of this embodiment being that a "BeDunk-BeeDeep" is far less troublesome then an actual dropped call. In other embodiments and when the algorithms used become more sophisticated to really recognize calculated latency or "dead space" to efficiently and seamlessly eliminate normal latency, the need for any such "BeDeep" or "BeDunk" audio notification will decrease or be eliminated altogether.

Besides voice convergence as described above, the RPOS system can facilitate data offload and data convergence. For example, in yet another embodiment, the Home Box can serve and/or assist in transferring large media files, which normally take hours or days to send across the internet. Bit-Torrent, a peer-to-peer file sharing protocol has been used for distributing large amounts of data. Peer-to-peer or P2P is one of the most common protocols used for transferring large files. As new peers connect to the network and request the same file, their computer receives a different piece of the data from the seed. Once multiple peers have multiple pieces of the seed, BitTorrent allows each to become a source for that portion of the file. The effect of this is to take on a small part of the task and relieve the initial server, Home Box, or user distributing the file from having to send or receive the file from or to just one server or computer. Multiple sources containing the many smaller pieces of the larger file when the download task is spread among the seed and many peers, the file delivery is much quicker to the end-user.

In one embodiment, when a large media file, such as a feature length high definition film, is purchased through the RPOS CARD or other RPOS or non-RPOS system, immediately upon activation, the RPOS convergent system working through the Home Box can begin orchestrating when and where the best storage and retrieval options are for the end-user and then begin file transport immediately or to accomplish the desired "seeding."

As in voice convergence, where a lost connection can break the call, in large file transfer, a lost connection can break the download. Just like server putting cookies on a local browser, the RPOS system and digital agents working through and/or within the Home Box can assist in restarting the download or seeding processes as needed whenever a file download is for whatever reason interrupted. Download managers (or accelerators) are computer programs dedicated to the task of downloading (and sometimes uploading) possibly unrelated stand-alone files from (and sometimes to) the Internet for storage. This is unlike a World Wide Web browser, which is mainly intended to browse web pages, composed of a multitude of smaller files, where error-free moving of files for permanent storage is of secondary importance. A failed or incomplete web page file rarely ruins the page, whereas an error to a HD media file can make it unplayable.

The typical download manager at a minimum provides means to recover from errors without losing the work already completed, and can optionally split the file to be downloaded (or uploaded) into 2 or more segments, which are then moved in parallel, potentially making the process faster within the limits of the available bandwidth. A few servers are known to block moving files in parallel segments on the principle that server capacity should be shared equally by all users. Multi-source is the name given to files that are downloaded in parallel. BitTorrent, on the other hand, is not server-end parallel because the file is potentially not coming from one server. BitTorrent is client-side parallel because it receives seeds from many locations simultaneously. An RPOS Digital Rights Convergent system can be used in many more ways to automatically begin orchestration of cloud media immediately upon purchase of a CARD or even in circumstances where traditional schemes for digital purchase are used, and can begin at any time, even before or after purchase.

Digital Rights, Content Licensing, and Space-time-place Shifting

It is intended that the Home Box is typically a non-user programmable firm-ware upgradeable form of networking equipment called consumer premises equipment ("CPE"), which can be compared to set top boxes ("STBs") often used by cable and satellite providers. Many similar configurations as those used by cable TV and satellite provided STB's may be considered useful in a TCP/IP networked environment. The Home Box in the Retail Point of Sale Convergence platform, enables interactions among the CMBC, digital agent, CPE and RPOS CARD for ownership systems. The CMBC MAC address level (also called layer-2) provides a secure means for licensing of electronic sell through of digital media assets to the enduser. Layer-2 is typically considered a TCP/IP based protocol, but other protocols for security and file transport may be used.

While it is desirable that the Home Box is a convergent platform, and like a typical cable TV or Satellite receiver set top box, it might be network accessible, but it need not always be online or "live" on the network. The Home Box secure means for licensing intended functions may act as a digital rights storage locker whereby licenses (or rights) may be checked out and later checked back in. It might be embodied to work as a private library of licenses, but since it might also interact on the Mother system, like a public library, it may close from time to time and even while books (in this case the viewing unlock codes) remain checked out, the system need not be powered on or connected at all times. Whereby any computer might fulfill the pure programming functional needs of an STB, a Home Box digital storage locker should at least periodically, if not constantly, perform a handshake protocol "check-in" with the Mother system to verify continuity of licenses and that no systems have been hacked or otherwise compromised.

Working within this TCP/IP based realm which is the most widely used protocol on the internet today, the Recording Industry Association of America (RIAA) among others has had some success in stopping certain types of Internet uses for digital copies of music, but there are really three important cases that explain why recording artists advocate groups such as the RIAA have not been able to stop all personal copying of protected works: the cases are Sony, the RIO Case, and Napster. See Sony Corp. of America v. Universal City Studios, Inc. 464 US 417 (1984); Recording Indus. Assn. of America v. Diamond Multimedia Sys., Inc., 180 F.3d 1072 (C.A.9 1999); A&M Records, Inc. v. Napster, Inc. 239 F.3d 1004, (9th Cir. 2001).

The Sony case holdings show us that "time shifting" is included in the rights for consumer listeners where a consumer can record broadcasts for viewing at a later time. The opinion states that "noncommercial time-shifting in the home satisfies this standard of noninfringing uses both because respondents have no right to prevent other copyright holders from authorizing such time-shifting for their programs, and because the District Court's findings reveal that even the unauthorized home time-shifting of respondents' programs is legitimate fair use."

The second important case is RIO. Recording Indus. Assn. of America v. Diamond Multimedia Sys., which is often called RIO for short because of the name of the music player they manufactured. In that case, the court compared the "time-shifting" of Sony to "space-shifting" (the change in format from digital WAV format on CDs to MP3 format on the player or on the Internet). The RIO case shows us that when format changes occur with minimal change to any audio characteristics, that "[s]uch copying is paradigmatic noncommercial personal use." Thus the practice of space-shifting also constituted fair use and Diamond Multimedia was allowed to continue manufacturing its Diamond RIO MP3 Player. But unlike the Sony case in which the "time-shifting" was about VHS tape or Sony Beta-Max recording devices, the RIO case was specifically about another device, the MP3 player. Both RIO and Sony, however, leave us wondering just how far the holdings can be applied to other technology.

And the Napster case, which introduced the idea "place-shifting" (although not yet called by that name in 2001) was considered a victory for recording artists advocacy groups, which in effect restricted MP3 downloading sites from allowing distribution of unauthorized MP3s. The court still recognized that there may be substantial non-infringing uses for such sites, but that websites like Napster will "[bear] the burden of policing the system within the limits of the system" for deterring those who might use the website for infringing purposes.

Thus, creating and downloading copyrighted electronic media will not itself create a basis for infringement, and place-shifting became the third fair-use technology, but only if done according to the requirements of maintaining digitally protected copyrights. This fair-use means that consumers that have purchased music or other media have the right to make back-up copies in new formats for their own personal use and store or play them when, where, or on whatever player they choose. A simple change in the formatting that does not alter the listening or viewing quality of the original work will constitute fair use under the current legal scheme, which has yet to be successfully overturned in the federal courts in the USA.

The new strategy that has been evolving for licensing Internet music is related to the development of license tracking technology. Internet license tracking technology could be compared to a "used" records, tapes, and CDs store. Used items of music are not about publishing at all, but about the reselling of an already existing licensed copy. And, if the "New Media" industry (artists, studios, and recording labels) are not readily open to the idea of distributing new materials in the form of a clean digital license (i.e. simply paying a fee to a wholesale distributor or digital rights clearing house for the right to sell a digital copy) why not go back and reinvent the distribution system of what has already been authorized the same way that a used records store would? Some of the internet companies are doing just that: they sell used tapes, records, or CDs on the Internet, but still conduct their business much like the mail order catalogs of the past with the same old-fashioned shipping and handling charges.

Time shifting, on the other hand, only allowed end-users to view media when they wanted. Then, space shifting allowed end-users to view media on the device of their choice. Today, "place shifting" as it has emerged as this third technology, to allow end-users to take advantage of broadband internet and have media streamed or forwarded from their home to various players, has been used for viewing remotely on a computer, netbook or mobile phone at any location with an internet connection. It is in this particular embodiment, the above described interactions of the digital agent, Home Box and RPOS CARD for ownership with MAC address layer-2 secure means for licensing (or electronic sell through) of digital media assets, creates the home digital rights storage and distribution locker. Rather than "place-shifting" the media itself from the home to the user, the RPOS Home Box sends digital rights for ownership which can follow the user, hereafter referred to herein as "place-chasing." Place-chasing means that the content license delivered to the end-user device can create still another set of credentialing requirements to unlock the legal fair use copy exceptions as described above.

As in all the fair-use technologies that have been legally deployed previously, where the fair-use legal gateway always involved some form of "one to one relationship" (i.e. only one device can be the recipient of place-shifted material at one time) in digital rights in the "place-chasing" embodiment of the present invention may be designed so that only one instance of the one instantly licensed content media can be served at one time. "Place-chasing," however, which does not always stream the media from the Home box, but rather sends the key to unlock the media, may involve all three of the classic fair-use technologies of time-shifting, space-shifting, and place-shifting. The difference may be rather than "slinging" media itself, only the rights to the media need to be "slung," and then the new ubiquitous nature of the Mother system can be better leveraged for the actual delivery of the media.

Attached storage, internet content caching facilities, network operating centers (NOC) systems, and local "head-end" technologies are just a few of the ways in which the internet is beginning to bring the actual data content (embodied as media content) closer to the user, which makes "place-chasing" rather than "place-shifting" the superior and more secure means of ensuring the one-to-one relationship between the content license and the actual viewing of the content.

Tunneling protocols can be used for encapsulation and can operate at higher and/or at the same level MAC (or layer-2 protocol) control. Secure VPN protocols include but are not limited to the following: IPsec (Internet Protocol Security); Transport Layer Security (SSL/TLS); Datagram Transport Layer Security (DTLS); Microsoft Point-to-Point Encryption (MPPE); Secure Socket Tunneling Protocol (SSTP); MPVPN (Multi Path Virtual Private Network); or SSH VPN.

Home Box ("Place-Chasing") CPE

The home box appliance for digital rights storage locker in a carrier mesh block convergent architecture is a legally superior form of space-time-place shifting through "place chasing." The Home Box serving as the digital rights storage locker makes it easy to "place-chase" end-user playback equipment from any remote location (i.e. the person could live in California and their digital rights storage locker could be databased in Chicago, in New York, or on a Home Box in Miami). It is contemplated that in many of the embodiments of the RPOS Convergent model, other place-chasing digital rights functionality may evolve to include many different types of equipment. In the programming realms of cyberspace, place-chasing need not be tied to just one Home Box, but also need not be tied to any one particular computer box. Whereby end-user possession need not always be physical, but in the preferred embodiment is custodial. One or multiple Home Box instances for a particular end-user may be physical and/or custodial, and used to unlock media rather than deliver media. This relationship allows a one-to-one fair use exception from one place to another ("place chasing") whether the end-user is a person, persons, or entity figure.

However, when the digital rights storage locker begins at a home box, true psychological ownership is also accomplished. The physical digital rights storage locker, Home Box, appliance can be carried on the person, kept within the end-user's home, or placed at the licensed user's place of business. Custodial ownership, not location, can visually and psychologically communicate the true "place-chasing" digital rights understanding to the end-user. A physical device which the person or entity can point to as their digital rights storage locker is a superior framework compared to a virtual (cyberspace only) digital rights framework.

Streaming from home used to mean only streaming the actual content. Now with the RPOS convergent system, "place-chasing" can mean digital rights streaming (as in viewing rights) so that the prescribed player can be at any location and ubiquitously obtain the actual content stream from anywhere on the Mother system which is closest to the machine, for example, from caching servers, local head-end systems, or even an attached storage unit such as a local hard-drive or USB port.

The place-chasing Home Box (home appliance in basic) may be nothing more than a programmable logic controller with minimal memory storage and perhaps at least one mode of network presence. An electronics component list of a network enabled Home Box might include: case—enclosure equipment; main PCB; passive capacitors, resistors, etc.; discrete semiconductors, transistors, diods, etc.; electro-mechanical connectors; various single or multiple A/V—standard coax, stereo, mini, RCA, S-Video jacks; tuner modules for TV playback; mechanical hardware—fasteners, screws, etc.; high speed switching; CPU Integrated Circuits; RJ-45, IR control, sub-mini headphone jacks; electro-mechanical switches; analog TV video/stereo decoders; amplifiers; optical semiconductors; radio and/or wired electrical transceivers; integrated circuit memory; non-volatile storage, crystals; and power supply. Such components or similar components may be configured by one of ordinary skill in the art, along with computer firmware and/or software, so as to perform one or more of the following: send and receive data; store, sort and/or compare authorization messages, authentication messages, user credentials, verification messages, keys, and/or payment systems; display media content; transmit content; and/or rout network traffic.

In certain embodiments, the "place-chasing" Home Box may be a player, a content storage unit, a network routing device, and/or a digital rights database. The programming and applications may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, BASIC, Visual Basic, Pascal, Ada, Java, HTML, XML and FORTRAN are industry standard programming languages for which many commercial compilers can be used to create executable code.

The basic structure of a digital license as used for embodiments of the invention may contain encryption key(s) to decrypt the content, layer access controls and/or other information. Sometimes the licenses themselves may contain links or references to the licensed content. Digital license(s) may also contain rules related to either the access layer or content. A single unit license may contain credential information to multiples of protected content. But, in each instance of a digitally protected content, the viewing authorization may be protected individually. Even if the licenses are not separate (i.e. one license may contain multiple instances of the same or different titles) a single license may contain multiple credentials and each credential may use a separate form of serial copy management or DRM. Each license may evoke varying levels of access required at the credential level.

The layer access levels may also be hierarchical in nature; such that one license may include more levels of access then others. Varying levels of access may include different combinations of credentials. Access levels may include commonly used modes for digital rights management (DRM) or other serial copy protection may be employed. DRM for example, may require a user to provide a credential to the DRM system. The DRM system may analyze the license and determine which types of uses are allowed and which types of credentials may be used to authorize the use.

In certain embodiments of the Home Box system, the licenses and credentials, the Home Box may send or receive, can be a separate key structure and/or may be used to unlock the playing feature in a proprietary player on the user device. Conversely, if a non-proprietary player is used to play the content, then the Home Box system may be used to unlock the encrypted file, which encryption will cause a file not to play on any player device unless and until the encryption is unlocked. In other certain embodiments, the Home Box may play, transmit, or receive unlicensed media.

There can be one or more than one type of credential for any one instance of unlocking the player or unlocking the file. For example, if the provided credential is a user identity, then the user identity may fulfill the required key. If the provided credential is a password key, then the pass key can fulfill the required credential. The system may be robust to include many types of credentials or may require only one type of credential. It may require file encryption and/or may allow only one type of player. It is merely a question of programming complexity with which the Home Box is both equipped and programmed to handle that sets the complexity level of the digital protection. The claimed invention neither limits the number of credentials nor the types of credentials. It does not require or limit a number or type of unlocking mechanisms used.

If an unlocking key contains information about an end-user such as user ID and password and whether or not the user requesting access is the same end-user intended as the recipient of the license, the credentials can allow different levels of access, such as to allow the user to view, edit, record and/or copy. Thereby, the Home Box may be a "licensing library" which can allow viewing credentials to be checked out and checked back in. In some embodiments, only one end-user may use his/her credentials to check out a single instant license at one time, which accomplishes the legally required control for fair-use concepts in copyright to apply.

One such embodiment of the Home Box is depicted in FIG. 12, where it can communicate with a remote device operated by the end-user anywhere on the internet (or other public or private network) to control the one-to-one relationship between viewing license and actual viewing. A proprietary "client player" loaded on the "place chasing" receiving device can ensure that the one or multiple licensed users of the content have employed a secure network protocol to control the one-to-one relationship of the one view per one viewing license.

If additional instances of viewing of the one instant license were requested anywhere on the internet at the same time, the Home Box "place-chasing" appliance should either deny the second instance or require of the end-user to purchase any such second, third, or other multiple of instant licensing. In this preferred embodiment, it may also be desirable to employ a card reader slot on the home box which can be used directly in conjunction with the RPOS CARD to enter new licenses to the Home Box appliance. Many other embodiments for both I/O and network interface on the Home Box are contemplated.

The invention claimed is:

1. A method of legally transferring digital rights ownership from a first sales physical media material object to an online digital media object comprising;
   making a digital copy of a copyrighted media content contained in a first sales physical media material object;
   adding an impairment to said first sales physical media material object in conjunction with or after copying;
   initiating serial copy management of said digital copy; and
   transferring ownership in said first sales physical media material object with ownership of said digital copy as ownership of an online digital media object.

2. The method of transferring in claim 1 wherein said impairment is a traceable record.

3. The method of transferring in claim 2 wherein said traceable record is a tracking of a validation procedure.

4. The method of transferring in claim 1 wherein said impairment is a marking.

5. The method of transferring in claim 4 wherein said marking is humanly visible.

6. The method of transferring in claim 4 wherein said marking is done on the physical media material object.

7. The method of transferring in claim 4 wherein said marking is done on the digital copy.

8. The method of transferring in claim 4 wherein said marking is done as one or more of marking on the physical media material object, on the digital copy, or on packaging of the physical media material object.

9. A method of legally validating digital rights ownership obtained from a first sales physical media material object to an online digital media object comprising;
    making a digital copy of a copyrighted media content contained in a first sales physical media material object;
    adding an impairment to said first sales physical media material object object in conjunction with or after copying;
    initiating serial copy management of said digital copy; and
    registering ownership of said media material object with ownership of said digital copy as ownership of an online digital media object.

10. The method of validating in claim 9 wherein said impairment is a traceable record.

11. The method of validating in claim 10 wherein said traceable record is a tracking of a validation procedure.

12. The method of validating in claim 9 wherein said impairment is a marking.

13. The method of legal validating in claim 12 wherein said marking is humanly visible.

14. The method of validating in claim 12 wherein said marking is done on the physical media material object.

15. The method of validating in claim 12 wherein said marking is done on the digital copy.

16. The method of validating in claim 12 wherein said marking is done as one or more of marking on the physical media material object, on the digital copy, or on packaging of the physical media material object.

17. A method of legally transferring digital rights ownership from a first sales physical media material object to an online digital media object comprising;
    first, making a digital copy of a copyrighted media content contained in a first sales physical media material object;
    second, adding an impairment to said first sales physical media material object;
    third, initiating serial copy management of said digital copy; and
    fourth, transferring ownership in said first sales physical media material object with ownership of said digital copy as ownership of an online digital media object.

18. A method of legally validating digital rights ownership obtained from a first sales physical media material object to an online digital media object comprising;
    first, making a digital copy of a copyrighted media content contained in a first sales physical media material object;
    second, adding an impairment to said first sales physical media material object;
    third, initiating serial copy management of said digital copy; and
    fourth, registering ownership of said media material object with ownership of said digital copy as ownership of an online digital media object.

* * * * *